(12) United States Patent
Howard

(10) Patent No.: US 7,379,493 B2
(45) Date of Patent: May 27, 2008

(54) SIGNAL ANALYZER FOR DETECTING DISTORTIONS IN SIGNALS

(75) Inventor: Robert J. Howard, Clifton, VA (US)

(73) Assignee: Lockheed Martin Corporation, Manassas, VA (US)

( * ) Notice: Subject to any disclaimer, the term of this patent is extended or adjusted under 35 U.S.C. 154(b) by 802 days.

(21) Appl. No.: 10/862,738

(22) Filed: Jun. 7, 2004

(65) Prior Publication Data

US 2005/0271130 A1    Dec. 8, 2005

(51) Int. Cl.
*H04B 3/46* (2006.01)
*H04B 17/00* (2006.01)
*H04Q 1/20* (2006.01)

(52) U.S. Cl. .................... 375/224; 375/285

(58) Field of Classification Search ........... 375/224, 375/227, 228, 285, 296, 342, 346; 324/76.11
See application file for complete search history.

(56) References Cited

U.S. PATENT DOCUMENTS

| 5,099,200 A | 3/1992 | Tarantino et al. |
| 5,144,642 A | 9/1992 | Weinberg et al. |
| 5,146,418 A | 9/1992 | Lind |
| 5,343,404 A | 8/1994 | Girgis |
| 5,517,522 A | 5/1996 | Arweiler et al. |
| 5,740,064 A | 4/1998 | Witte et al. |
| 6,385,237 B1 | 5/2002 | Tsui et al. |
| 6,498,820 B1* | 12/2002 | Thomson et al. ........... 375/346 |
| 6,680,983 B2* | 1/2004 | Happonen ................... 375/316 |
| 7,035,324 B2* | 4/2006 | Mar et al. .................... 375/224 |
| 2003/0048837 A1* | 3/2003 | Sakai et al. ................. 375/224 |
| 2003/0081705 A1* | 5/2003 | Miller ......................... 375/346 |
| 2003/0179821 A1* | 9/2003 | Lusky et al. ................ 375/224 |

OTHER PUBLICATIONS

Hamila, Ridha et al., "Time-Frequency Signal Analysis Using Teager Energy," Proceedings of the IEEE Workshop on Nonlinear Signal and Image Processing, pp. 4. (Sep. 1997).
Maragos, Petros, et al., "Higher-Order Differential Energy Operators," IEEE Signal Processing Letters, vol. 2, Issue 8, pp. 152-154 (Aug. 1994).

* cited by examiner

*Primary Examiner*—Jean B. Corrielus
(74) *Attorney, Agent, or Firm*—Dicke, Billig & Czaja, PLLC

(57) ABSTRACT

A signal analyzer system comprises a differential operator configured to receive at least one input signal, and to determine at least one locus based on instantaneous differences in a relative rate of change between the at least one input signal and the at least one input signal's at least one $n^{th}$-order derivative, wherein n represents at least one selected order of differentiation. A distortion identifier is configured to compare at least one amplitude of the at least one determined locus against at least one selected reference locus, and to identify at least one distortion in the signal when the comparison indicates at least one selected exception condition.

59 Claims, 15 Drawing Sheets

SIGNAL ANALYZER FOR DETECTING DISTORTIONS IN SIGNALS

GOVERNMENT INTEREST

This invention was made with Government support under Government Contract No. M3L027, program SMMJT V1. The Government has certain rights in the invention.

THE FIELD OF THE INVENTION

The present invention relates to signal processing, and more particularly relates to a system and method for identifying the presence of distortions in a signal.

BACKGROUND OF THE INVENTION

In modern signal processing systems or in the development thereof, a need often arises to identify the presence and location of distortions appearing in a signal of interest. These distortions may result from signal corrupting effects external to the system; for example, processing errors in other subsystems, errors caused by signal generators, or transient effects on the transmission channel. Also, signal errors manifested as distortions may be caused internally to the signal processing system, whether by hardware or software problems. Systems ill equipped to handle erroneous signal distortions may process the errors as part of the signal, resulting in undesired system output. Furthermore, subsystems as functional blocks of more complex systems that internally corrupt a signal may cause errors to propagate through downstream processing blocks of the greater system.

For illustrative purposes, the problems of characterizing signals for distortions are discussed in the context of commonly-used digital signal processing (DSP) systems. It should be recognized, however, that similar problems and their effects are also prevalent in the various types of analog as well as discrete-signal systems. In digital systems, signal discontinuities may be caused by errors in signal acquisition systems, such as in sampling or quantization functions. Moreover, errors may be introduced by the signal processing functions. For example, commonly-utilized array processor algorithms operate on blocks of N samples to improve the efficiency of the underlying hardware. Block programming errors can result in the system's mishandling of the data blocks, giving rise to problems such as duplication of samples, dropped samples, and other so-called artifacts.

In addressing these concerns, system designers and developers conduct testing of the systems for various types of errors. The present state of the art has no simple, reliable and widely applicable method available to test for the presence of intermittent errors in signals. Known methods are generally ad-hoc, and either heuristic and labor-intensive, or complex and resource-intensive, requiring an understanding of complex signal processing techniques.

One methodology involves continuously monitoring system output for errors using laboratory instruments. Being manual and slow in nature, this method is inherently unreliable, expensive, and limited in its effectiveness to identification of repeating events, such as periodic glitches in an observable periodic signal's waveform. Other methods involve the use of signal analysis algorithms, such as spectral analysis or autocorrelation functions to detect repeated errors and extraneous harmonics. These techniques may be automated, but are relatively complex to implement. When realized in a system, they require a significant amount of system resources, such as memory and processing capacity. As with the manual methods, statistical tools, such as autocorrelation, are not effective for single, isolated errors. Methods involving comparing an erroneous signal with its uncorrupted version require processing more than one signal, and are consequently system resource-intensive. Simpler methods, such as sampling with peak detection, fail to detect relatively small signal distortions and repeated or skipped samples.

SUMMARY OF THE INVENTION

One aspect of the present invention provides a signal analyzer system including a differential operator and a distortion identifier. The differential operator is configured to receive at least one input signal, and determine at least one locus based on instantaneous differences in a relative rate of change between the at least one input signal and the at least one input signal's at least one $n^{th}$-order derivative, wherein n represents at least one selected order of differentiation. The distortion identifier is configured to compare at least one amplitude of the at least one determined locus against at least one selected reference locus, and to identify at least one distortion in the signal when the comparison indicates at least one selected exception condition.

DESCRIPTION OF THE PREFERRED EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Signal Analyzer

Figure 1A:
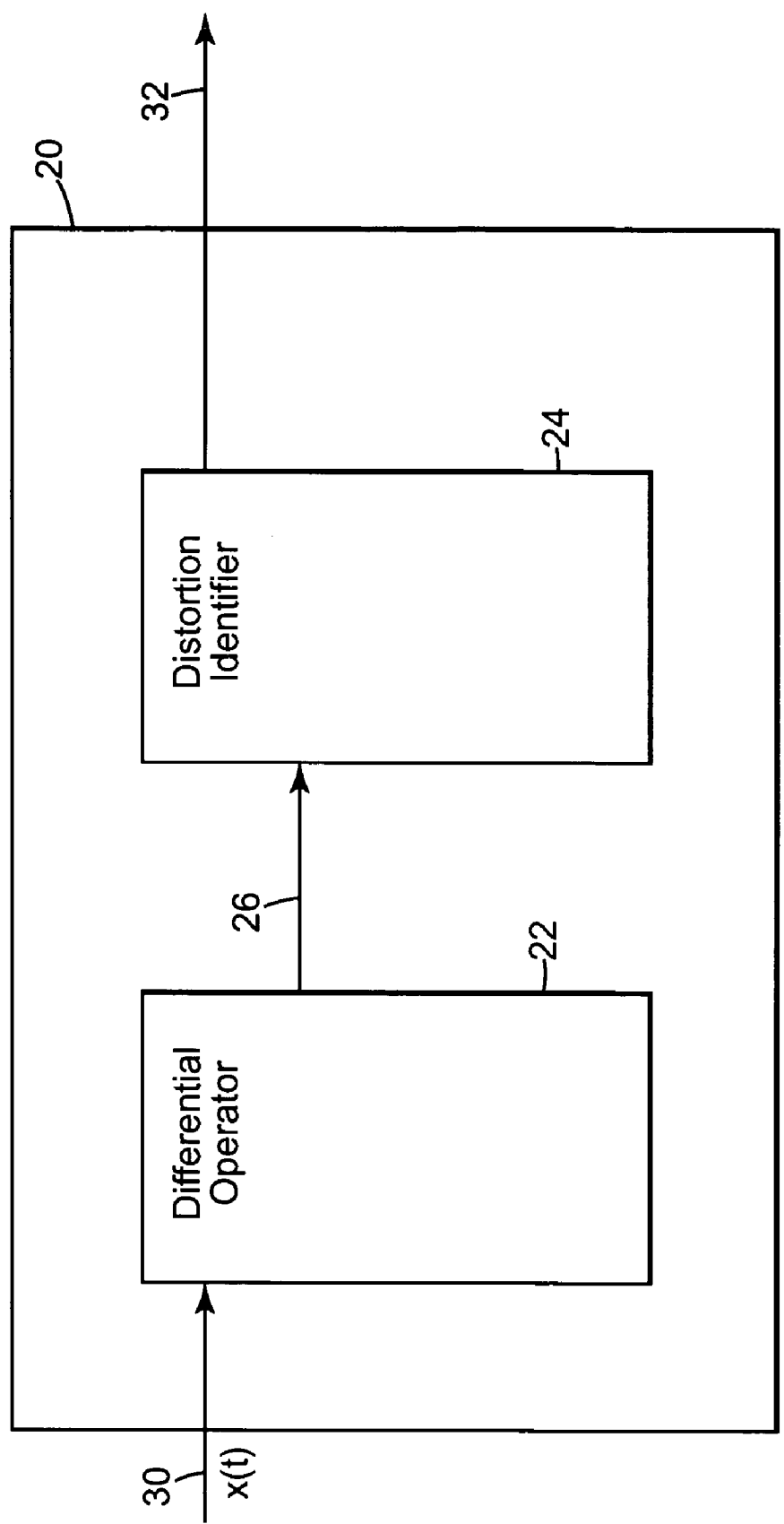
FIG. 1A is a block diagram of a signal analyzer according to one embodiment of the present invention.

One embodiment of a signal analyzer according to the present invention is illustrated generally at 20 in FIG. 1A. Signal analyzer 20 analyzes an input signal x(t), indicated at 30, to identify distortions in input signal 30's waveform. Input signal 30 can be provided by any suitable preceding system block, which can include but is not limited to, a signal generator, a signal storage device, or a signal processor. Distortions are herein defined to include points of sharp or unusual transition in a signal's waveform relative to surrounding points in the waveform.

Signal analyzer 20 provides output 32 comprising an identification of distortion in signal 30. Signal analyzer 20 includes differential operator 22 and distortion identifier 24. Differential operator 22 accepts input signal 30 and performs one or more selected operations to produce differential operator output 26, which has properties facilitating distortion identification. Distortion identifier 24 accepts differential operator output 26 and performs selected functions on differential operator output 26 to produce distortion identification output 32.

Figure 1B:
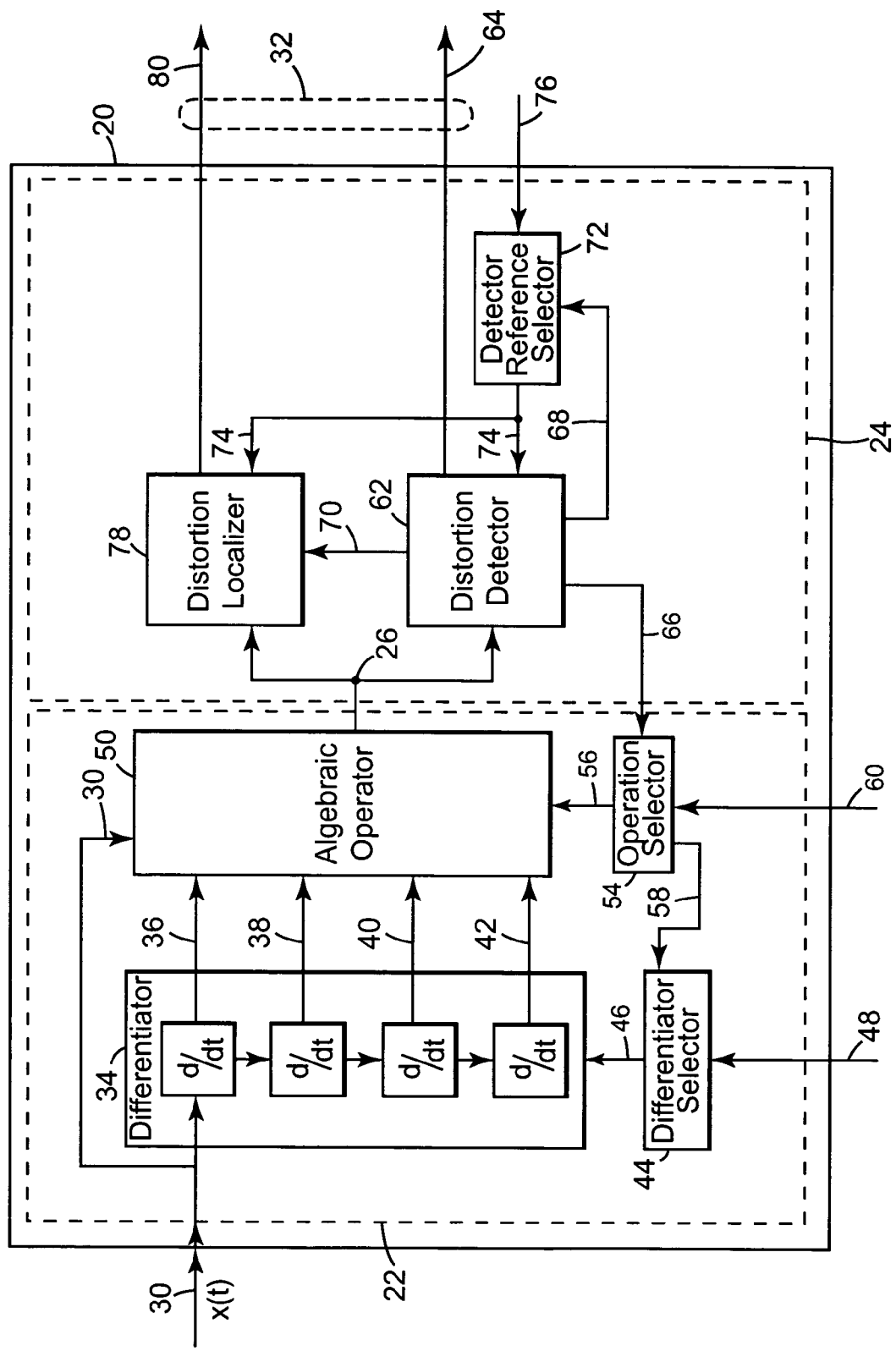
FIG. 1B is a more detailed block diagram of one embodiment of the signal analyzer illustrated in FIG. 1A.

FIG. 1B is a more detailed block diagram illustrating one embodiment of signal analyzer 20. Differential operator 22 comprises differentiator 34, differentiation selector 44, algebraic operator 50, and operation selector 54. Input signal 30 is provided to differential operator 22 and to differentiator 34. Algebraic operator 50 provides differential operator output 26 to distortion identifier 24.

Distortion identifier 24 comprises distortion detector 62, detector reference selector 72, and distortion localizer 78. Distortion detector 62 provides distortion detector output 64. Distortion localizer 78 provides distortion localizer output 80. Distortion identifier output 32 includes distortion detector output 64 and distortion localizer output 80.

Differentiator 34 receives input signal 30 and performs differentiation of a selected order on input signal 30 to provide derivatives of input signal x(t) indicated at 36, 38, 40, and 42. Differentiation selector 44 provides the differentiation operation 46 to be performed by differentiator 34 based on external differentiation selection input 48, operation select 58, and/or predetermined differentiation selection.

In one embodiment, derivatives 36, 38, 40, and 42 respectfully represent the first, second, third, and fourth derivatives of input signal x(t) 30. Differentiation up to and including the fourth order derivative facilitates useful algebraic relationships presented in the following description. However, it should be understood that other embodiments of the present invention can include taking higher-order derivatives. In an automatic system, pre-computing derivatives of input signal 30 prior to performing further calculations is desirable, because it reduces overall computation time; however, other embodiments may combine differentiation and further calculations into a single functional block within differential operator 22.

Algebraic operator 50 accepts signal x(t) 30 and its derivatives 36 and 38, and, as needed for the selected operations to be performed, higher order derivatives, such as derivatives 40 and 42. Algebraic operator 50 performs one or more operations to produce differential operator output 26. Operation selector 54 provides operation 56 to be performed by algebraic operator 50, based on external operation select input 60, distortion detector output 66, and/or predetermined operation selection.

In another type of embodiment, operation selector 54 determines all operations to be performed within differential operator block 22 to produce differential operator output 26. In one such embodiment, operation selector 54 receives differential operation selection from external operation select input 60, and accordingly works together with differentiation selector 44 to provide the appropriate derivatives of signal x(t) and the one or more algebraic operations 56 needed for execution of the one or more selected differential operations. In this embodiment, external differentiation selection input 48 is redundant, and therefore, optional.

Distortion detector 62 receives differential operator output 26 and performs a comparison between differential operator output 26 and selected detector reference 74 to produce distortion detector output 64 indicating the presence or absence of distortion in input signal 30. Detector reference selector 72 selects and provides at least one detector reference 74 based on external reference select input 76, distortion detection 68, and/or a predetermined reference. If distortion detector output 64, which is the result of the comparison, has certain attributes that would not be expected in the absence of distortion in signal 30, then distortion detector output 64 is deemed to meet an exception condition.

Distortion detection indication 70 is similar to distortion detector output 64 in that it is indicative of the presence of detected distortion in signal 30. However, while distortion detector output 64 is in the form of an output suitable for reception by an external entity, distortion detection indication 70 is used internally to distortion identifier 24. Distortion localizer 78 receives differential operator output 26 and distortion detection indication 70. If distortion detection indication 70 indicates the presence of distortions in input signal 30, distortion localizer 78 analyzes differential operator output 26 to produce distortion localizer output 80 indicating the approximate locations of any discontinuities in input signal 30.

Figure 2A:
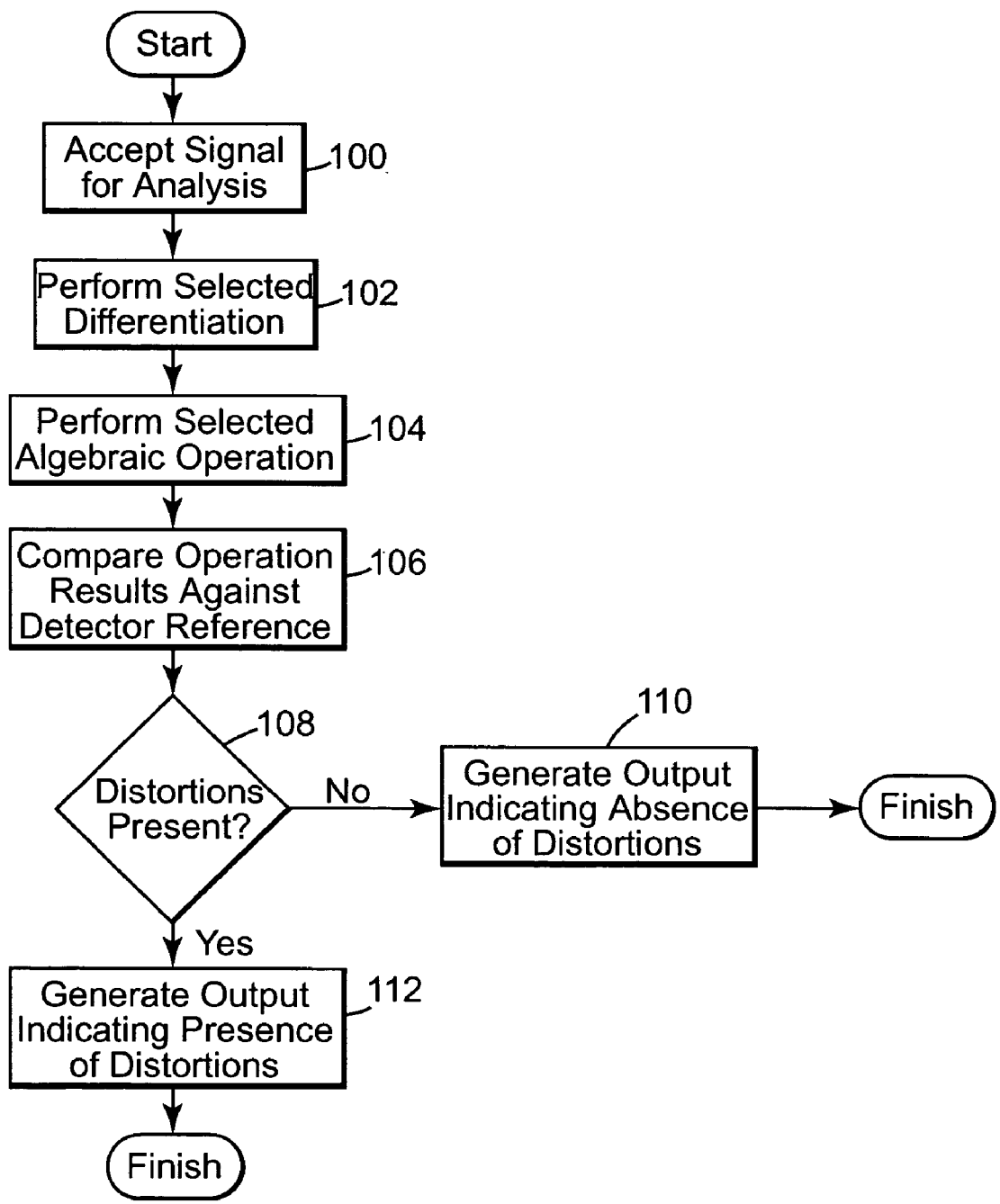
FIG. 2A is a flow diagram of one embodiment of a process that can be performed by the signal analyzer illustrated in FIG. 1B.

FIG. 2A is a flow diagram illustrating one embodiment of a method of indicating presence or absence of distortions in an input signal according to the present invention. At 100, signal analyzer 20 receives input signal 30 to be analyzed. At 102, differentiation is performed on input signal x(t) 30 up to a selected order. At 104, a selected differential operation is performed to produce differential operator output 26. Differential operator output 26 potentially includes points corresponding to distortions present in input signal 30. At 106, differential operator output 26 is compared against selected detector reference 74 to identify the presence or absence of distortions in the input signal. For example, the comparison at 106 can include performing threshold detection wherein the threshold is represented by selected detector reference 74. Based on whether distortion was identified, a determination is made at 108, to generate a corresponding output indicating absence of distortion at 110 or indicating presence of distortions at 112.

Figure 2B:
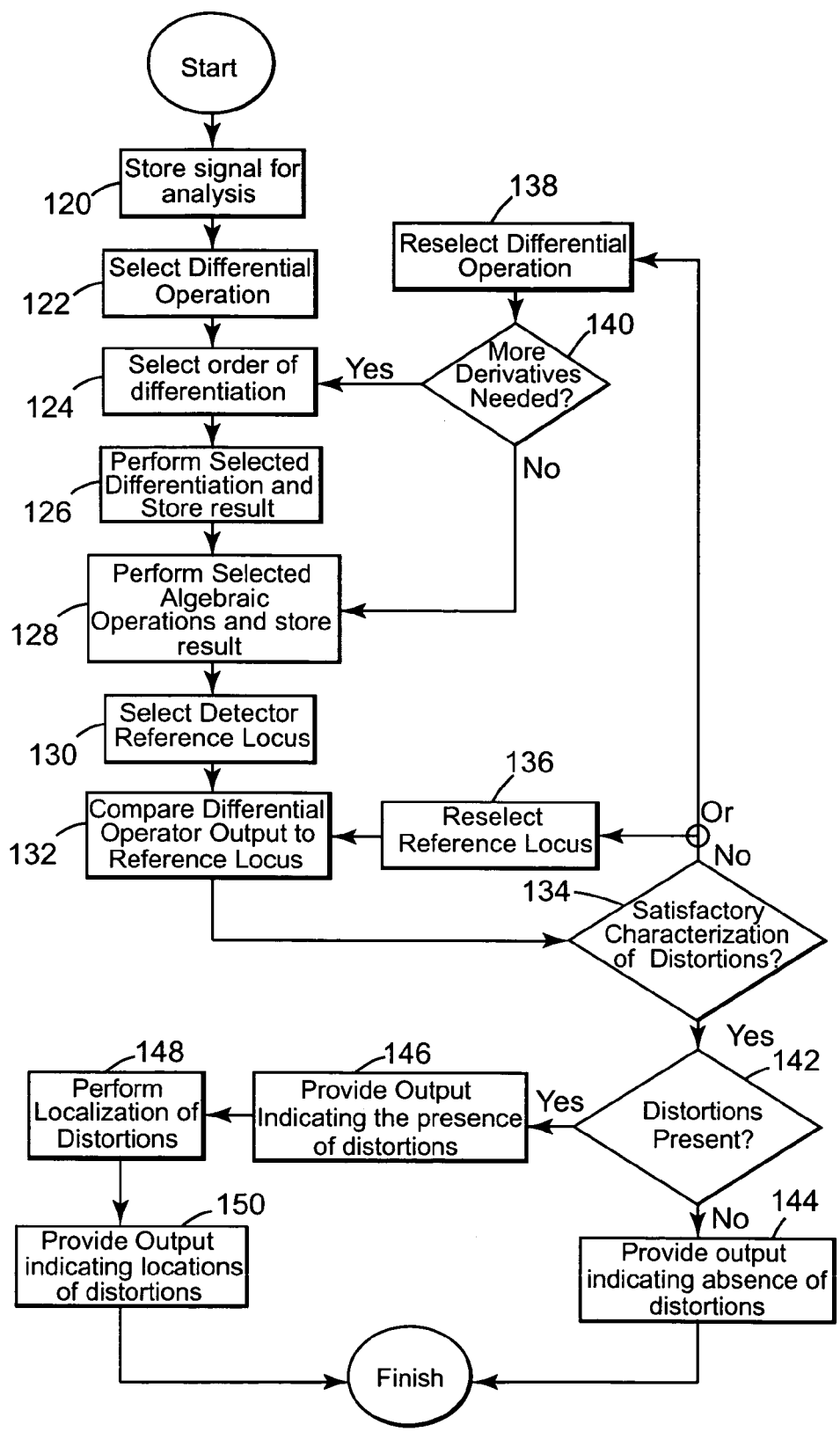
FIG. 2B is a flow diagram of another embodiment of a process that can be performed by the signal analyzer illustrated in FIG. 1B.

FIG. 2B is a flow diagram illustrating a more elaborate process of one embodiment of a method of indicating presence and location of distortion or absence of distortion in an input signal according to the present invention. At 120, the input signal to be analyzed is received and stored. At 122, a differential operation, comprising differentiation and algebraic operations is selected. In one embodiment, the operation selection is based on a preselected operation. In another embodiment, the operation selection is supplied via external operation select input 60. In another embodiment, the operation selection is based on a combination of internal and external parameters. For example, external operation select input 60 can provide an index to a table containing a set of selectable operations.

At 124, the order of differentiation is selected. In one embodiment, the differentiation order selection is based on a preselected order of differentiation. In other embodiments, it is supplied via external differentiation selection input 48, or selected based on operation select 58. The differentiation selection can also be based on a combination of internal and external parameters.

At 126, differentiation is performed on input signal 30, and its selected derivatives 36, 38, 40, and/or 42 are stored. At 128, a selected algebraic operation is performed to produce differential operator output 26 based on the selected algebraic relationship between input signal x(t) 30 and its selected derivatives 36, 38, 40 and/or 42; and differential operator output 26 is stored. Differential operator output 26 can include points corresponding to distortions present in input signal 30.

At 130, detector reference 74 is selected against which differential operator output 26 is to be compared. In various embodiments, detector reference 74 is selected based on a preselected detector reference, or is supplied via external reference select input 76. Detector reference 74 can also be selected from a combination of internal and external parameters.

At 132, a comparison is made between differential operator output 26 and selected detector reference 74 to identify points in differential operator output 26 potentially indicating the presence or absence of distortions in input signal 30. For example, in one embodiment, the comparison 106 includes performing threshold detection where the threshold is represented by selected detector reference 74.

Operations 134, 136, 138, and 140 exemplify an adaptive scheme to improve the versatility of the process illustrated in FIG. 2A, at the cost of added complexity. Together, these operations facilitate a method of sequentially generating a plurality of differential operator outputs 26 and comparing them against a sequential plurality of selected detector references 74. At 134, a decision is made whether any difference between differential operator output 26 and selected detector reference 74 provides a reliable indication of the presence of distortions in the input signal 30. For example, if the comparison at 132 includes performing threshold detection, then the decision at 134 may include assessing whether the threshold's amplitude, or sensitivity, was appropriately configured. The assessment may require comparing differential operator output 26 against more than one threshold; accordingly, at 136, a new detector reference 74 is selected, and a comparison is performed between the newly selected detector reference 74 and the stored differential operator output 26. Comparing differential operator output 26 against more than one threshold can be accomplished with an iterative process including sequentially varying a configurable threshold.

If varying selected detector reference 74 fails to produce a reliable indication of distortion in input signal 30, a new differential operation can be selected. Accordingly, at 138, a differential operation is reselected, and at 140, a determination is made as to whether additional differentiation is needed for the new differential operation. Further differentiation, if needed, and the newly selected algebraic operations are then performed on the stored input signal and its derivatives in operations 124, 126, and 128. Operations 130 and 132 compare the new differential operator output 26 against a selected threshold, and at 134 a decision is again made whether further adjustment to selected detector reference 74 or differential operator output 26 is desired. In one embodiment, operation 134 can be preferred by distortion detector 62.

At 142, based on the preceding operations, a decision is made as to whether distortion is present in the input signal 30. If no distortion is present at 142, distortion detector output 64, at 144, represents that the input signal 30 is free of distortion. If at 142 distortions are determined to be present in the input signal 30, distortion detector output 64, at 146, indicates the presence of distortion in input signal 30. At 148, differential operator output 26 is analyzed to determine the approximate location of each distortion. At 150, distortion localizer output 80 is provided indicating the distortion locations.

Input Signal and Distortion

Signal x(t) is a function x of independent variable t, and may be represented in the continuous or discrete independent variable or dependent variable domains. Since signals most often represent functions of time, independent variable t used herein may be referred to in terms of time and rate; however, it should be recognized that t may represent an independent variable other than time. As a digital signal, x(t) comprises a set of values spaced at a discrete sampling interval and quantized to a certain number of discrete amplitudes.

Figure 3A:
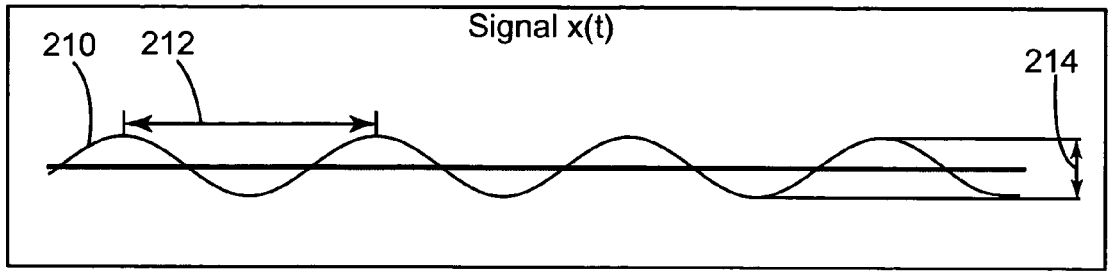
FIG. 3A is a diagram illustrating an example of a single-frequency sinusoidal signal.
Figure 3B:
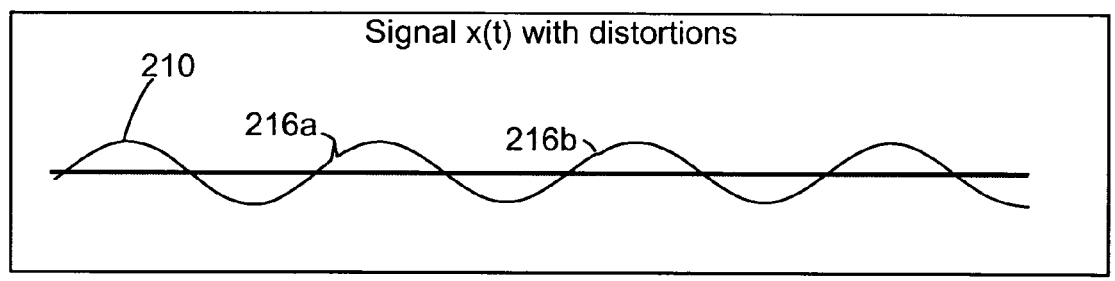
FIG. 3B is a diagram illustrating two momentary distortions in the signal of FIG. 3A.
Figure 3C:
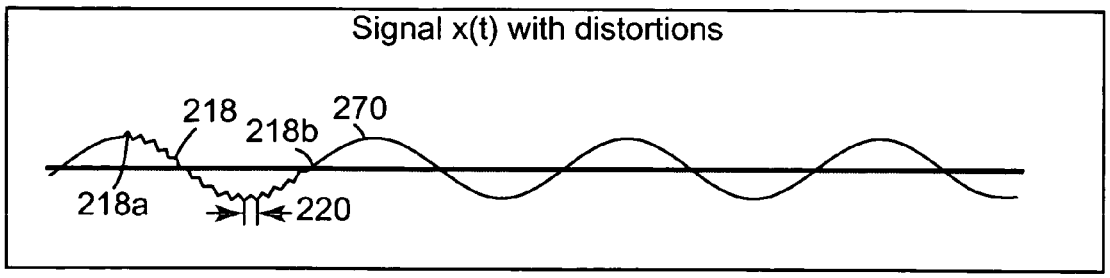
FIG. 3C is a diagram illustrating a continuous type of distortion in the signal of FIG. 3A.

Signal x(t) can contain at least one point of distortion, herein defined to include points of sharp transition in a signal's waveform relative to surrounding points in the waveform. FIGS. 3A-3G provide example illustrations of signals with and without distortion. FIG. 3A illustrates an example of a single-frequency sinusoidal signal 210, having a period 212, and peak-to-peak amplitude 214. FIG. 3B illustrates signal 210 with two disturbances indicated at 216a and 216b. Disturbance 216a is pictured as a transient spike in amplitude; whereas 216b is a less severe disturbance manifested as a time delay. Points of signal 210 where disturbances 216a and 216b are present are distortions. To further explain the definition of distortion as used herein, FIG. 3C illustrates signal 210 with a higher frequency sinusoidal disturbance 218, having a period indicated at 220, superimposed over a portion of signal 210. Even though disturbance 218 is itself a continuous and smoothly-transitioning function, all points of signal 210 where disturbance 218 is present are distortions because the higher-frequency disturbance 218 introduces a momentary rate of variation in signal 210 that is greater than signal 210's normal rate of variation.

Figure 3D:
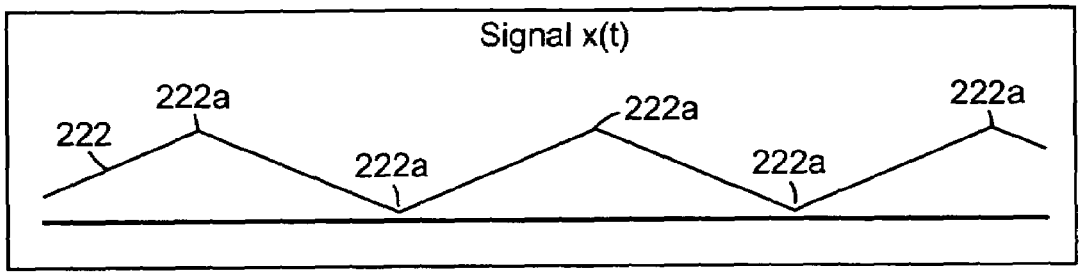
FIG. 3D is a diagram illustrating a signal having a triangular waveform.
Figure 3E:
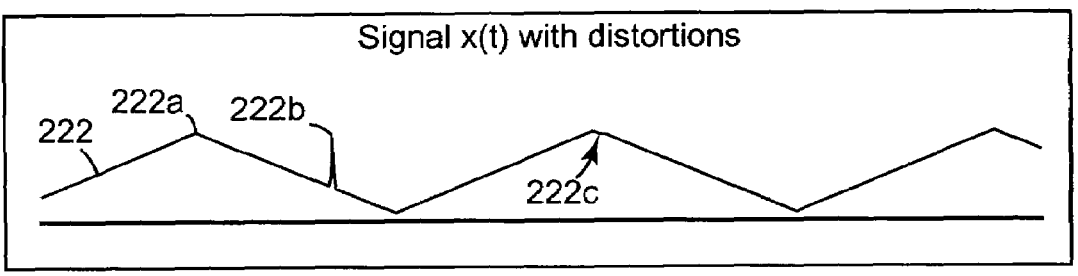
FIG. 3E is a diagram illustrating two distortions in the signal of FIG. 3D.

The definition of distortion may include parts of a signal other than momentary disturbances. For example, FIG. 3D illustrates a triangular or saw-tooth waveform 222 with corners or peaks 222a. Peaks 222a are distortions. FIG. 3E illustrates the triangular signal 222 with two additional distortions indicated at 222b and 222c, for a total of three types of distortions. Relative to one another, distortion 222b is the most severe; distortion 222a is moderately severe; and distortion 222c is the least severe.

Figure 3F:
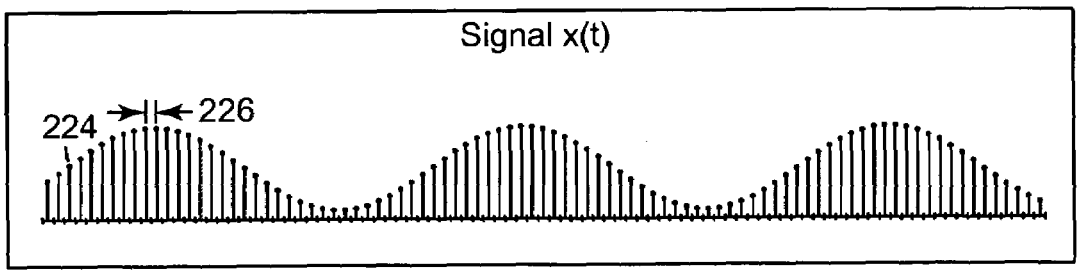
FIG. 3F is a diagram illustrating a single-frequency sinusoidal signal represented in the discrete-time domain.
Figure 3G:
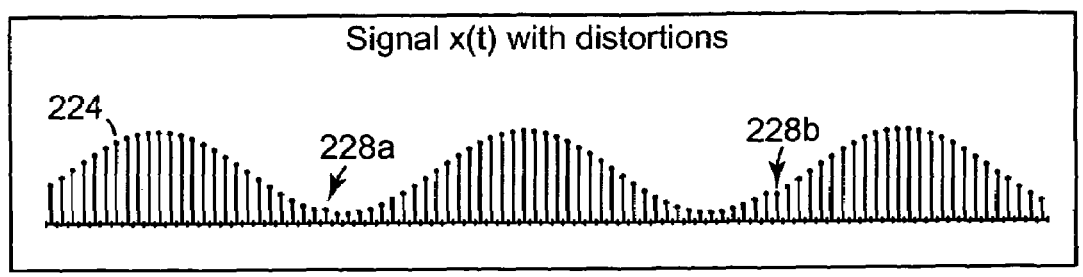
FIG. 3G is a diagram illustrating two distortions present in the signal of FIG. 3F.

In the discrete time domain, distortions may be manifested as samples representing a sharp transition in the signal relative to the surrounding samples. FIG. 3F illustrates a discrete time signal 224 with sampling period 226. FIG. 3G illustrates two distortions, 228a and 228b; both introduce abrupt changes in the discrete signal waveform 224. In this example, distortion 228a is a repeated sample, and 228b is a repeated sample with a time shift of subsequent samples.

Differential Operator

Qualitatively, differential operator 22 in FIGS. 1A and 1B performs an operation on input signal x(t) based on instantaneous differences in a relative rate of change between signal x(t) and a derivative of x(t) of a selected order. In one embodiment, the operation performed by differential operator 22 is based on calculating at least one Lie bracket of signal x(t) 30 and x(t)'s derivative of a selected order as given by the following Equation I.

$$\psi_n\{x(t)\} = \frac{dx^{k+1}(x)}{dt} \cdot \frac{d^{n-k-1}x(t)}{dt^{n-1}} - \frac{d^k x(t)}{dt} \cdot \frac{d^{n-k}x(t)}{dt^n}, \quad \text{Equation I}$$

wherein n>k, n ∉ integers, reals or complex numbers where $\psi_n\{x(t)\}$ is defined as the $n^{th}$-order Lie bracket of signal x(t) and x(t)'s $(n-1)^{th}$-order derivative; wherein the signed x(t) is differentiated k times prior to applying the Lie bracket; and where n represents the order of differentiation.

If k=1, noise will generally be decreased in the output. One embodiment where k=1 is given by the following Equation II.

$$\psi_n\{x(t)\} = \frac{dx(t)}{dt} \cdot \frac{d^{n-1}x(t)}{dt^{n-1}} - x(t) \cdot \frac{d^n x(t)}{dt^n}, \quad \text{Equation II}$$

wherein n ∉ integers, reals or complex numbers

In one embodiment of Equation II, n is an integer greater than 1 representing the order of differentiation. In this embodiment, $\psi_n\{x(t)\}$ for n=1 is zero for all t; hence, $\psi_1\{x(t)\}$ is zero in this embodiment of the invention. Use of Lie bracket-based mathematical operators is described in greater detail in P. Margos, A. Potamianos, "Higher-Order Differential Energy Operators," submitted to *IEEE Signal Processing Letters* (1994), which is incorporated herein by reference.

Variations of the above Equations I and II are possible where operators have more than two terms multiplied together for each term in the sum. In addition, some embodiments employ differential operators in non-linear functions, such as logarithms.

One embodiment of differential operator 22, as illustrated in FIG. 1B, comprises differential operator 34 for performing differentiation on input signal x(t) 30 and separate algebraic operator 50 for subsequently performing algebraic operations on the precomputed derivatives. As stated above, precomputing the derivatives improves system efficiency. However, other embodiments can combine the differentiation and algebraic operations into a single differential operator.

In FIG. 1B, differentiator 34 takes derivatives $$\frac{d^n x(t)}{dt^n}$$

of signal x(t) 30 up to and including a selected order n. Practically, differentiation up to and including at least the second order is used to facilitate the algebraic operation performed by algebraic operator 50. Differentiation up to and including the fourth order is suitable for most applications; however, the present invention is not limited to any particular order of differentiation. For example, some embodiments employ higher order derivatives to facilitate more complex differentiation and algebraic operations useful in certain applications of the present invention.

The following discussion describes an embodiment of the present invention that operates on an exemplary discrete-time signal x[i], which is a variety of input signal x(t). In this example, independent variable i is an integer representing the sample index number; thus, x[2+3] represents the amplitude of function x at sample 5. It should be recognized that there are many ways to discretize derivatives. Therefore, the following Equations III through VI are merely illustrative of one embodiment. In this embodiment, Equations III-VI estimate all the derivatives at the same point in time.

$$\frac{dx[i]}{di} = 0.5 \cdot (x[i+1] - x[i-1])$$ Equation III $$\frac{d^2 x[i]}{di^2} = x[i+1] - 2 \cdot x[i] + x[i+1]$$ Equation IV $$\frac{d^3 x[i]}{di^3} = 0.5(x[i+2] - 2 \cdot x[i+1] + 2 \cdot x[i-1] - x[i-2])$$ Equation V $$\frac{d^4 x[i]}{di^4} = x[i+2] - 4 \cdot x[i+1] + 6 \cdot x[i] - 4 \cdot x[i-1] + x[i-2]$$ Equation VI One embodiment of algebraic operator 50 calculates an $n^{th}$-order Lie bracket $\psi_n\{x(t)\}$ of input signal x(t) 30, wherein n is a selected order of the differential operation. The result of this operation is herein termed locus $\psi_n\{x(t)\}$. Locus $\psi_n\{x(t)\}$ can include points having amplitudes corresponding to the severity of distortions in input signal x(t). The locations of such distortion points within locus $\psi_n\{x(t)\}$ can approximately correspond to the respective locations of distortions in input signal 30. Therefore, locus $\psi_n\{x(t)\}$, when properly combined in algebraic relationships, such as detailed below, can be employed to identify the presence of distortion in the input signal and can approximately localize the distortions within the input signal.

Loci $\psi_n\{x(t)\}$ span the same independent variable range as input signal x(t).

For the above-example embodiment that operates on exemplary discrete-time signal x[i], and using the above discrete-time derivatives represented by Equations II-V, the following Equations VII-IX represent discrete-time Lie brackets of the second order, third order, and fourth order, respectively.

$$\psi_2\{x[i]\} = \left(\frac{x[i+1] - x[i-1]}{2}\right)2 - x[i] \cdot (x[i+1] - 2 \cdot x[i] + x[i-1])$$ Equation VII $$\psi_3\{x[i]\} = \left(\frac{x[i+1] - x[i-1]}{2}\right) \cdot (x[i+1] - 2 \cdot x[i] + x[i-1]) - x[i] \cdot \left(\frac{x[i+2] - 2 \cdot x[i+1] + 2 \cdot x[i-1] - x[i-2]}{2}\right)$$ Equation VIII $$\psi_4\{x[i]\} = \left(\frac{x[i+1] - x[i-1]}{2}\right) \cdot \left(\frac{x[i+2] - 2 \cdot x[i+1] + 2 \cdot x[i-1] - x[i-2]}{2}\right) - x[i] \cdot (x[i+2] - 4 \cdot x[i+1] + 6 \cdot x[i] - 4 \cdot x[i-1] + x[i-2])$$ Equation IX Another embodiment of algebraic operator 50 calculates a plurality of loci $\psi_n\{x(t)\}$, wherein n equals orders of differential operation 2 and 4. Further, loci $\psi_2\{x(t)\}$ and $\psi_4\{x(t)\}$ are combined in an algebraic relationship to produce locus $\omega\{x(t)\}$ as given by the following Equation X.

$$\omega\{x(t)\} = \sqrt{\left|\frac{\psi_4\{x(t)\}}{\psi_2\{x(t)\}}\right|}$$ Equation X Another embodiment of algebraic operator 50 calculates a plurality of loci $\psi_n\{x(t)\}$, wherein n equals orders of differential operation 2 and 3. Further, loci $\psi_2\{x(t)\}$ and $\psi_3\{x(t)\}$ are combined in an algebraic relationship to produce locus $\rho\{x(t)\}$ as expressed by the following Equation XI.

$$\rho\{x(t)\} = \left|\frac{\psi_3\{x(t)\}}{2\psi_2\{x(t)\}}\right|$$ Equation XI Another embodiment of algebraic operator 50 calculates a plurality of loci $\psi_n\{x(t)\}$, wherein n equals orders of differential operation 2 and 4. Further, loci $\psi_2\{x(t)\}$ and $\psi_4\{x(t)\}$ are combined in an algebraic relationship to produce locus $A\{x(t)\}$ as expressed by the following Equation XII.

$$A\{x(t)\} = \left|\frac{\psi_2\{x(t)\}}{\sqrt{|\psi_4\{x(t)\}|}}\right|$$ Equation XII Another embodiment of algebraic operator 50 calculates selectable loci $\psi_n\{x(t)\}$, or selectable loci $\omega\{x(t)\}$, $\rho\{x(t)\}$, or $A\{x(t)\}$. FIG. 1B illustrates an exemplary topology supporting such an embodiment. Differentiation selector 44 and operation selector 54 can work in concert to facilitate selection of differential operation to produce the desired locus or loci. For example, in one embodiment, external operation select input 60 provides a selection for desired differential operator output locus 26. Operation selector 54 accordingly provides operation selection 58 to differentiation selector 44, and algebraic operation selection 56 to algebraic operator 50 indicating the desired operations to be performed. Differentiation selector 44 provides selected differentiation operation 46 to differentiator 34, which accordingly calculates the selected derivatives of signal x(t).

Figure 1C:
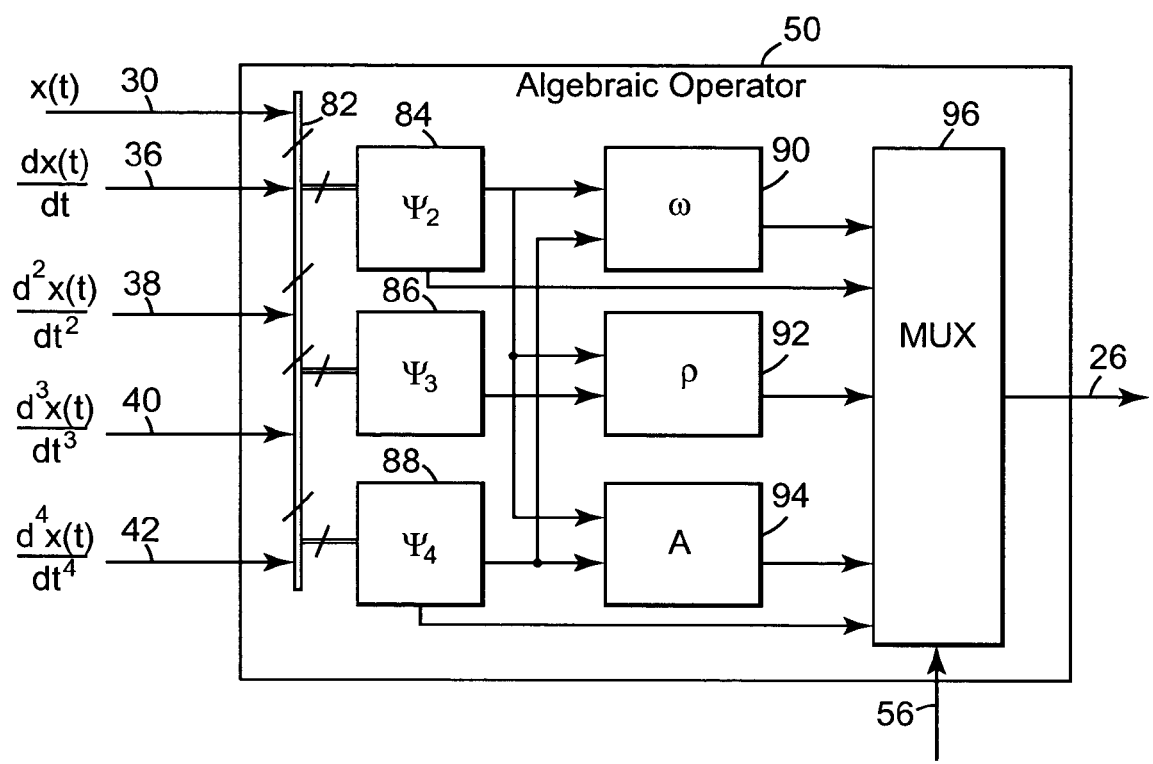
FIG. 1C is a block diagram of an algebraic operator illustrated in FIG. 1B.

FIG. 1C illustrates, in block diagram form, one embodiment of algebraic operator 50 suitable for implementing the present example operation. Derivatives of orders 1, 2, 3, and 4, indicated respectfully at 36, 38, 40, or 42, are supplied to algebraic operator 50, which then performs the selected operations. Path 82 provides signal x(t) 30 and the appropriate derivatives of x(t) to computation blocks $\psi_2$, $\psi_3$, and $\psi_4$, indicated respectively at 84, 86, and 88. For example, path 82 provides signal x(t) 30, first derivative 36, and second derivative 38 to computation block $\psi_2$ 84. Next, computation block 84 calculates and stores locus $\psi_2\{x(t)\}$; block 86 calculates and stores locus $\psi_3\{x(t)\}$; and block 88 calculates and stores locus $\psi_4\{x(t)\}$. Next, computation block 90 receives loci $\psi_2\{x(t)\}$ and $\psi_4\{x(t)\}$, and calculates and stores locus $\omega\{x(t)\}$ therefrom; computation block 92 receives loci $\psi_2\{x(t)\}$ and $\psi_3\{x(t)\}$, and calculates and stores locus $\rho\{x(t)\}$ therefrom; and computation block 94 receives loci $\psi_2\{x(t)\}$ and $\psi_4\{x(t)\}$, and calculates and stores locus $A\{x(t)\}$ therefrom. Finally, multiplexer 96 selects a locus among the stored loci $\psi_2\{X(t)\}$, $\psi_3\{X(t)\}$, $\psi_4\{X(t)\}$, $\omega\{x(t)\}$, $\rho\{x(t)\}$, and $A\{x(t)\}$ based on selected operation 56, and provides output 26 comprising the selected locus.

Figure 4A:
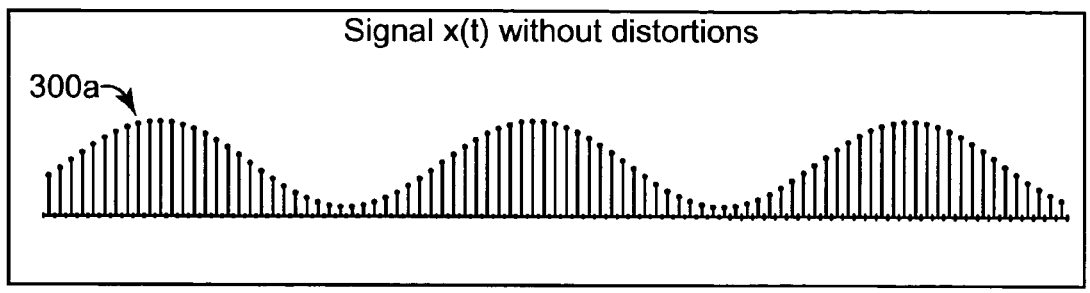
FIG. 4A is a diagram illustrating a discrete-time representation of a sinusoidal signal that is also quantized.
Figure 4B:
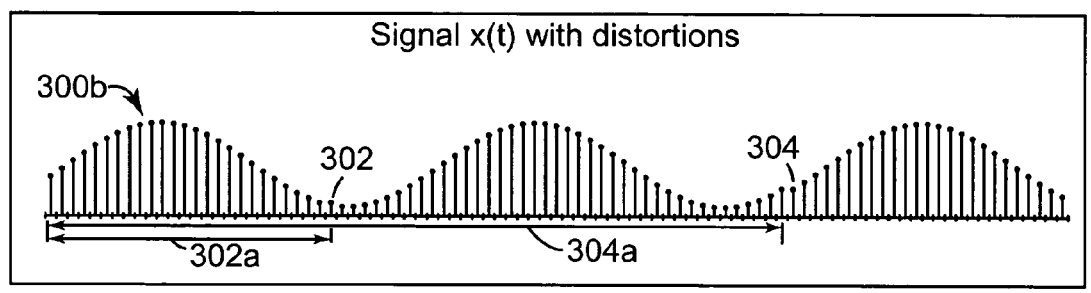
FIG. 4B is a diagram illustrating two distortions present in the signal of FIG. 4A.

FIGS. 4A through 4H illustrate the effect of differential operator 22 on an exemplary signal x(t) with distortions. FIG. 4A illustrates a discrete-time representation of a sinusoidal signal 300a, quantized to 128 levels. FIG. 4B illustrates sinusoidal signal 300b with two distortions, indicated at 302 and 304. Distortion 302 is manifested as a repeated sample; distortion 304 is manifested as a repeated sample and time shift of subsequent samples. Distortion 302 is located at interval 302a from an initial point of signal 300b; distortion 304 is located at interval 304a from the initial point of signal 300b. Comparatively, distortion 302 appears to be less severe than 304 in FIG. 4B. In this example, the signal illustrated in FIG. 4B is one example of an input signal x(t) 30 to differential operator 22 illustrated in FIGS. 1A and 1B.

Generally, Lie brackets of all order two or greater perform about equally well, but even where individual Lie brackets, such as loci $\psi_2\{x(t)\}$, $\psi_3\{x(t)\}$, and $\psi_4\{X(t)\}$, are not particularly useful for reliably identifying certain types of distortions, algebraic combinations of Lie brackets, such as $\omega\{x(t)\}$, $\rho\{x(t)\}$, and $A\{x(t)\}$ can be useful for identifying certain types of distortions. For example, FIGS. 4F and 4G illustrate that loci $\omega\{x(t)\}$ and $\rho\{x(t)\}$, comprising loci $\psi_2\{x(t)\}$, $\psi_3\{x(t)\}$, and $\psi_4\{x(t)\}$ in combination, are useful for detecting and approximately localizing the exemplary distortions in this particular example of distorted sinusoidal input signal 300b.

Figure 4C:
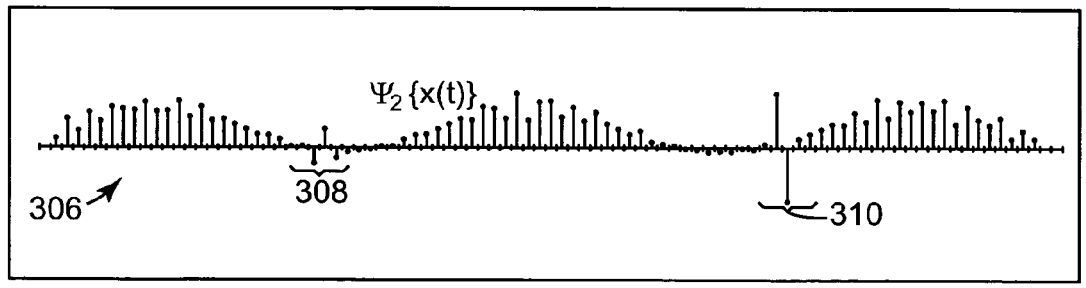
FIG. 4C is a diagram illustrating exemplary locus $\psi_2\{x(t)\}$, as determined by applying a differential operation to the signal of FIG. 4B according to one embodiment of the present invention.

Exemplary locus $\psi_2\{x(t)\}$ is illustrated in FIG. 4C and indicated generally at 306. The points in locus $\psi_2\{x(t)\}$ indicated at 308 and 310 respectively correspond to distortions 302 and 304. Points 310 are observable as abrupt interruptions in the general pattern of locus $\psi_2\{x(t)\}$; however, points 308 are less prevalent.

Figure 4D:
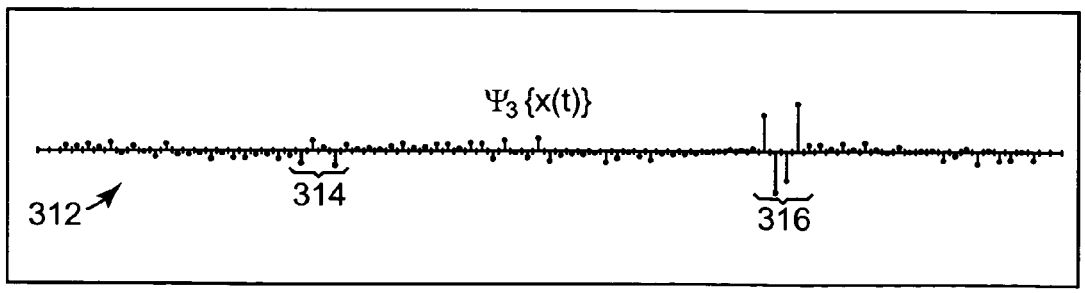
FIG. 4D is a diagram illustrating exemplary locus $\psi_3\{x(t)\}$, as determined by applying a differential operation to the signal of FIG. 4B according to one embodiment of the present invention.

Exemplary locus $\psi_3\{x(t)\}$ is illustrated in FIG. 4D and generally indicated at 312. The points in locus $\psi_3\{x(t)\}$ indicated at 314 and 316 respectively correspond to distortions 302 and 304. Points 316 are observable as having amplitudes uncharacteristic of other points in locus 312; however, points 314 are indistinguishable from other points not corresponding to distortion in signal 300b.

Figure 4E:
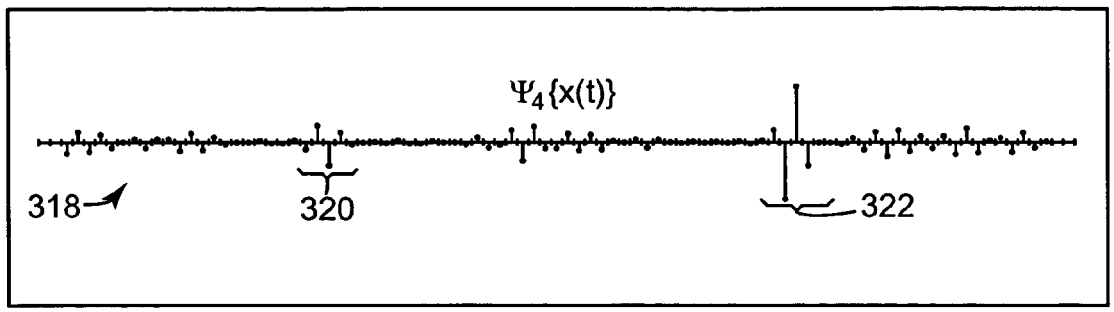
FIG. 4E is a diagram illustrating exemplary locus $\psi_4\{x(t)\}$, as determined by applying a differential operation to the signal of FIG. 4B according to one embodiment of the present invention.
Figure 4F:
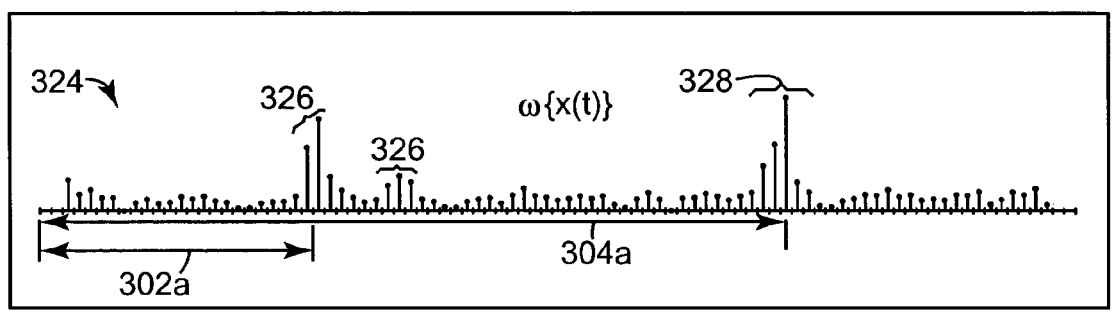
FIG. 4F is a diagram illustrating exemplary locus $\omega\{x(t)\}$, as determined by applying an algebraic operation to the loci of FIGS. 4C and 4E according to one embodiment of the present invention.
Figure 4G:
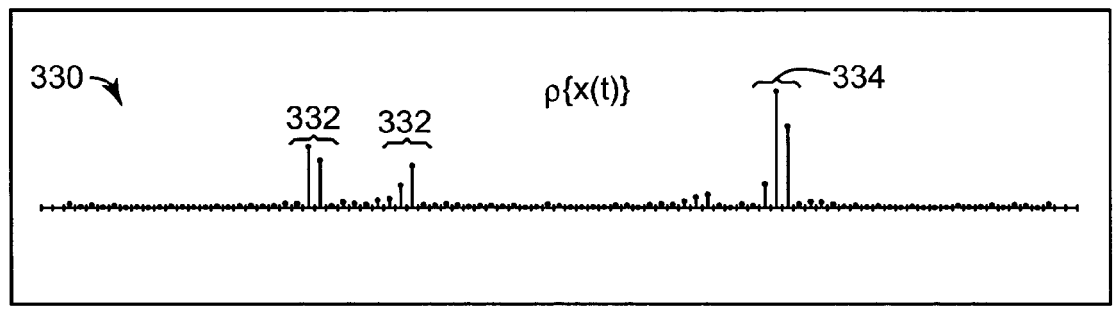
FIG. 4G is a diagram illustrating exemplary locus $\rho\{x(t)\}$, as determined by applying an algebraic operation to the loci of FIGS. 4C and 4D according to one embodiment of the present invention.

Exemplary locus $\psi_4\{x(t)\}$ is illustrated in FIG. 4E and generally indicated at 318. The points in locus $\psi_4\{x(t)\}$ indicated at 320 and 322 respectively correspond to distortions 302 and 304. Points 322 are observable as having amplitudes uncharacteristic of other points in locus 318; however, points 320 are indistinguishable from other points not corresponding to distortion in signal 300b.

As illustrated by FIGS. 4D and 4E, for a sinusoidal input signal, the Lie brackets of even order greater are substantially constant.

Exemplary locus $\omega\{x(t)\}$ is illustrated in FIG. 4F and generally indicated at 324. The points in locus $\omega\{x(t)\}$ indicated at 326 and 328, respectively correspond to distortions 302 and 304; and are easily distinguishable from the remaining points in locus $\omega\{x(t)\}$. Therefore, locus $\omega\{x(t)\}$ indicated at 324 provides a reliable indicator of distortion in signal x(t) 300b. Moreover, since the peaks of points 326 and 328 are approximately located at intervals 302a and 304a, respectively, locus $\omega\{x(t)\}$ indicated at 324 provides the approximate locations of distortions in signal 300b.

Locus $\rho\{x(t)\}$ generally indicated at 330 in FIG. 4G provides similar results as locus $\omega\{x(t)\}$, with an additional benefit of improved sensitivity. Thus, points 332 and 334 respectively corresponding to distortions 302 and 304, are more prevalent relative to the other points in locus $\rho\{x(t)\}$ indicated at 330.

Figure 4H:
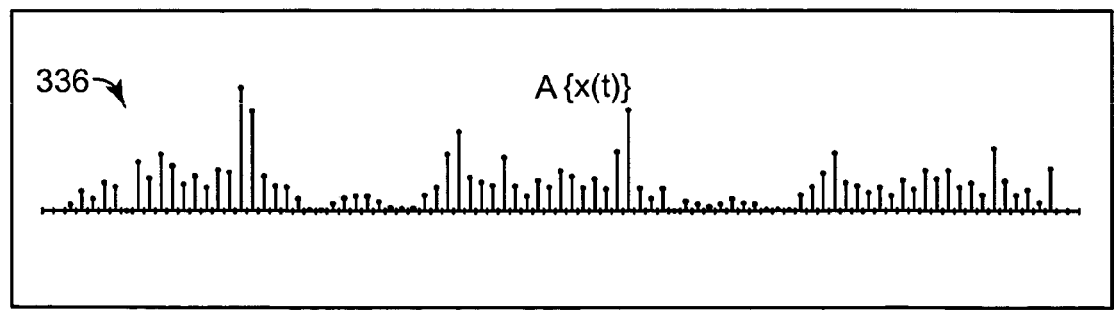
FIG. 4H is a diagram illustrating exemplary locus $A\{x(t)\}$, as determined by applying an algebraic operation to the loci of FIGS. 4C and 4E according to one embodiment of the present invention.

In the particular example of distorted sinusoidal input signal 300b, locus $A\{x(t)\}$, generally indicated at 336 in FIG. 4H, is not particularly useful for identifying the distortion in sinusoidal input signal 300b. However, $A\{x(t)\}$, $\rho\{x(t)\}$, and $\omega\{x(t)\}$ generally perform equally well for identifying distortions. The performance of these locus depends on the particular example type of signal and type of signal distortions. Moreover, loci $\psi_2\{x(t)\}$, $\psi_3\{x(t)\}$, and $\psi_4\{x(t)\}$ can be employed in other possible algebraic combinations to detect and localize signal distortions for other types of signals and/or other types of distortions.

As mentioned above, for Lie brackets of even order, the Lie bracket is substantially constant for a perfect sinusoid. Therefore, it is particularly easy to set detection thresholds with a sinusoid test signal. Thus, other embodiments employ non-sinusoidal test signals, but with difficulty in predicting the detection thresholds. Certain distortions can be missed depending on the selected test signal. For example, if the test signal is white noise, most distortions can not be detected. Another example of a poor input signal would be a triangular or saw-tooth waveform, such as saw-tooth waveform 222 illustrated in FIG. 3D. A detector will produce strong spikes at the peaks 222a of saw-tooth waveform 222. In addition, the estimates for A, $\omega$, and $\rho$ are singular for a saw-tooth waveform between peaks. The Lie brackets for a saw-tooth waveform are zero between peaks.

Distortion Identifier

In the embodiments illustrated in FIGS. 1A and 1B, distortion identifier 24 interprets differential operator output locus 26 to identify distortions in input signal 30. Distortion identifier 24 provides distortion identifier output 32 which comprises distortion detection output 64 indicating the presence of distortion in input signal 30 and, if any distortions are indicated, distortion localizer output 80 indicating the approximate locations of the distortions in the input signal 30.

Distortion detector 62 performs a comparison between differential operator output locus 26 and a selected detector reference locus 74.

In one embodiment, a detection threshold is set employing standard signal processing techniques. For example, receiver operating characteristic (ROC) curves can be developed that process and then select an acceptable false alarm rate, misrate, etc. The mean and standard deviation of the output is then measured with a clean signal. In one embodiment, the detection threshold is selected to provide very low false alarm rates and desirably with a probability approaching one of detecting a distortion.

In practice, the signal to noise ratio is typically quite good with allows a relatively simple examination of the process with a clean signal and various selected distortions to thereby select a detection threshold. Such a simple manual process can be automated. In one embodiment, a clean signal is sent to the process and the detection threshold is set a little above the highest level output by the distortion detector. As a check, various distortions are tested to insure that the various distortions are actually detected with the detected threshold.

Generally, localization of signal distortions is typically accomplished to within plus or minus approximately n/2 samples.

In one embodiment, detector reference locus 74 comprises points of a selected amplitude over an independent variable interval that is equal to the independent variable interval of differential operator output locus 26. In this embodiment, the amplitude of detector reference locus 74 is configurable to fall between the highest or lowest amplitudes of points in differential operator output locus 26 that do not correspond to distortions in input signal 30, and points in differential operator output locus 26 corresponding to each distortion in input signal 30.

The following specific example describes an application of an example detector reference locus 74 to an example differential operator output locus 26 to identify the presence of local maxima therein representative of distortion. First, the example assumes a discrete-time input signal x[i] is given for independent variable i spanning integers 0 through 90. The example further assumes that x[i] was operated upon by differential operator 22 (shown in FIGS. 1A and 1B) to produce differential operator output locus ω{x[i]}.

Figure 5A:
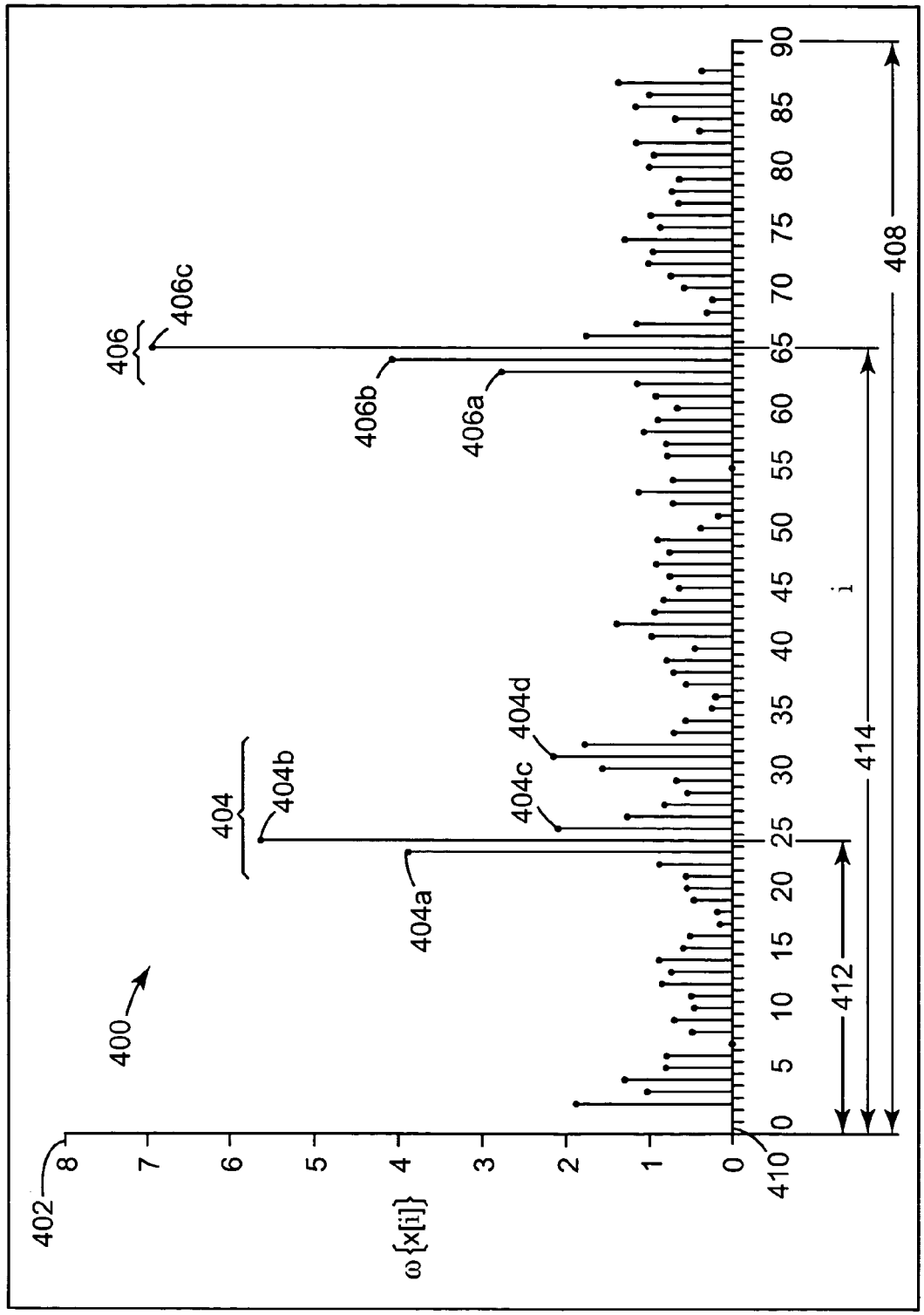
FIG. 5A is a diagram illustrating exemplary differential operator output locus $\omega\{x[i]\}$ according to one embodiment of the present invention.

FIG. 5A graphically illustrates locus ω{x[i]} indicated generally at 400. Points in locus 400 have amplitudes relative to scale 402. The points in locus 400 that correspond to two distortions in the input signal on which the differential operations were performed to obtain locus 400 are indicated generally at 404 and 406, respectively.

In this example, points in locus 400 not indicative of distortions in the input signal (i.e., points other than those indicated at 404 and 406) do not exceed an amplitude of 2. Conversely, the amplitudes of local maxima 404b and 406c exceed 5. Locus 400 spans an independent variable interval 408 from an initial point 410 such that interval 408 equals 90. Local maxima 404b and 406c are located respectively at intervals 412 and 414 from initial point 410 of locus 400. Specifically, maximum 404b is located at i=24; and maximum 406c is located at i=65.

Figure 5B:
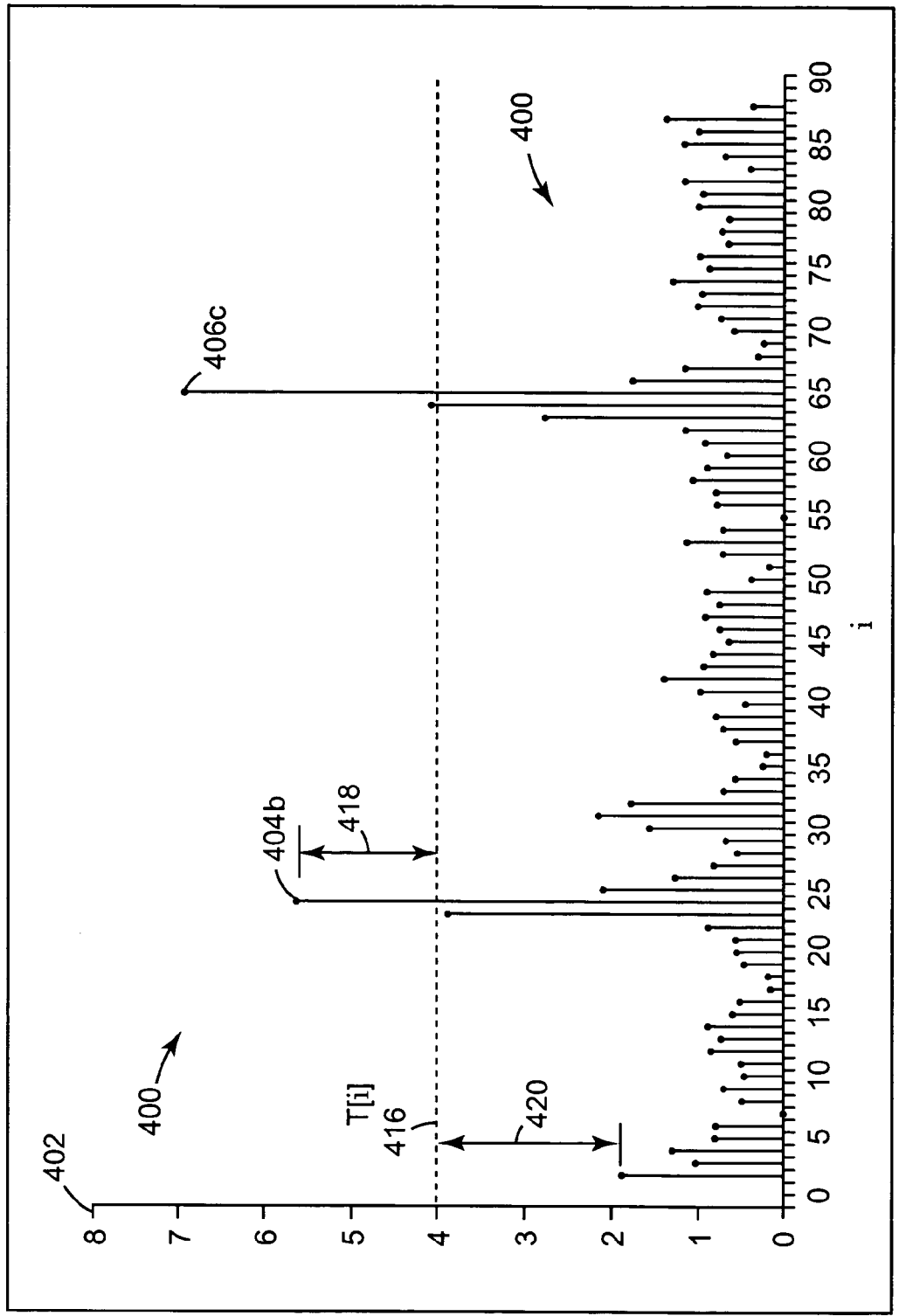
FIG. 5B is a diagram illustrating exemplary detector reference locus T[i] superimposed over the locus of FIG. 5A according to one embodiment of the present invention.

The following is an illustrative specific example of employment of a detected threshold to detect and localize signal distortion. FIG. 5B illustrates detector reference locus T[i] indicated at 416, superimposed over differential operator output locus 400. Detection reference locus 416 is defined over interval 408, and has a selected amplitude of 4 on scale 402, which is below the amplitude of local maximum 404b by margin 418 and below the amplitude of local maximum 406c by more than margin 418. Thus, detector reference locus 416 is above other points in locus 400 not representative of input signal distortion by margin 420.

Figure 5C:
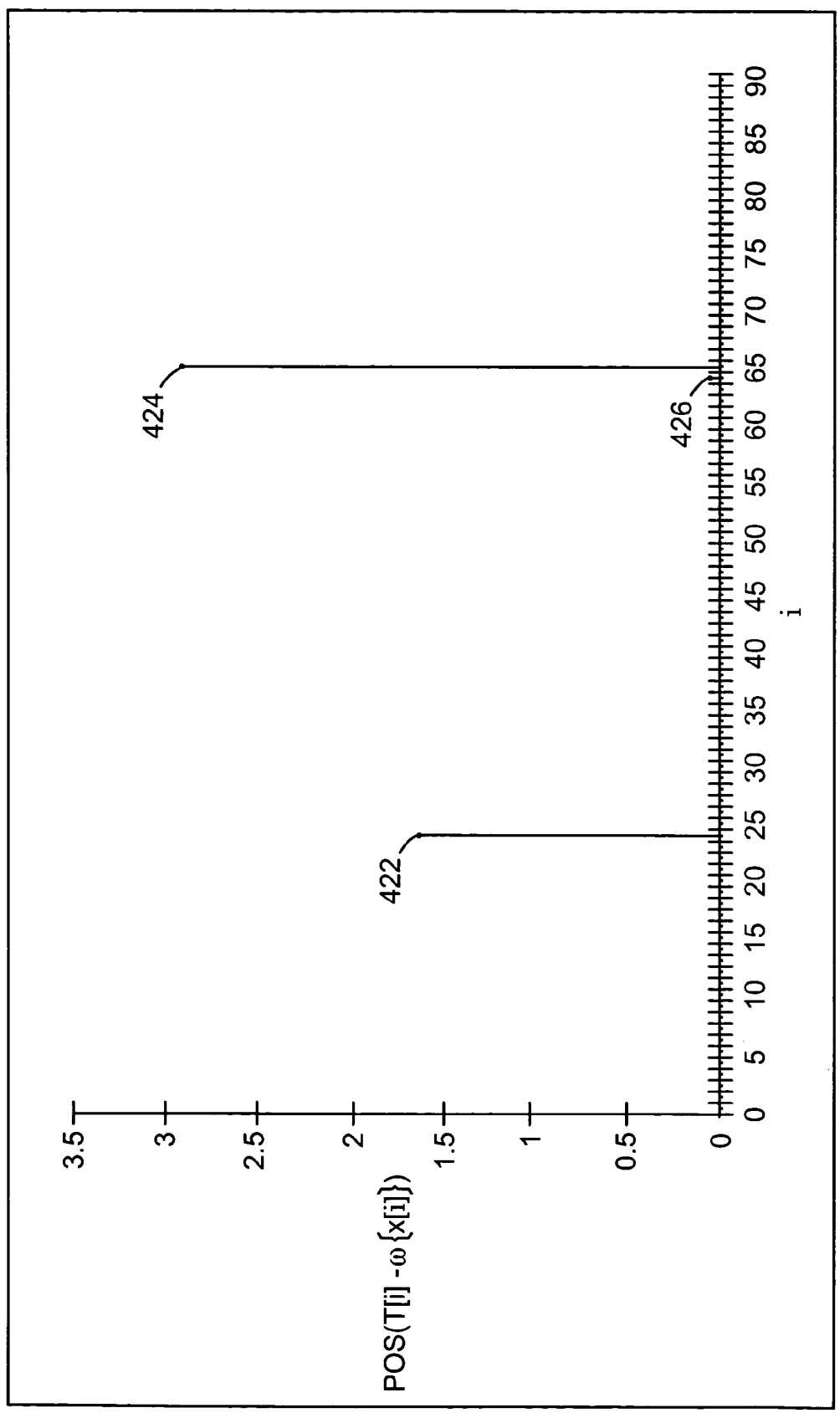
FIG. 5C is a diagram illustrating a resulting locus determined by taking all positive values of the arithmetic difference between the loci of FIGS. 5B and 5A according to one embodiment of the present invention.

In the present example, the comparison performed by distortion detector 62 (shown in FIG. 1B) includes taking the difference between detector reference locus T[i] and differential operator output locus ω{x[i]}, and disregarding all nonpositive values in the resulting difference locus. Expressed mathematically, the resulting difference locus is pos(T[i]−ω{x[i]}). The result of this comparison is illustrated in FIG. 5C. The presence of any points in pos(T[i]−ω{x[i]}) indicates that locus ω{x[i]} 400 has at least one maximum exceeding detector reference locus T[i]. Since T[i] is selected to distinguish between points in locus ω{x[i]} corresponding to distortions in input signal x[i], and points that do not correspond to distortions therein, the presence of points 422, 424, and 426 in FIG. 5C indicates the presence of distortion in input signal x[i]. Thus, distortion detection output 64 (shown in FIG. 1B) comprises a positive signal indicating the presence of distortion in input signal 30.

In the embodiment illustrated in FIG. 1B, distortion localizer 78 performs analysis on differential operator output locus 26 to determine the approximate locations of the distortions in input signal 30 when distortion detection indication 70 positively indicates the presence of distortion in the input signal. In one embodiment, the operation performed by distortion localizer 78 is effectively an extension of the operation of distortion detector 62 described above. Distortion localizer 78 provides distortion localizer output 80 comprising the independent variable values corresponding to the points in differential operator output locus 26 which, after having been compared to detector reference locus 74, are indicative of the presence of distortions in input signal 30.

In the present example, distortion localizer output 80 comprises a locus containing the independent variable i values of 24, 64, and 65, which correspond respectively to points 422, 426, and 424 in FIG. 5C, thereby indicating the approximate locations of the distortions in the input signal.

Signal Processor Tester

Figure 6A:
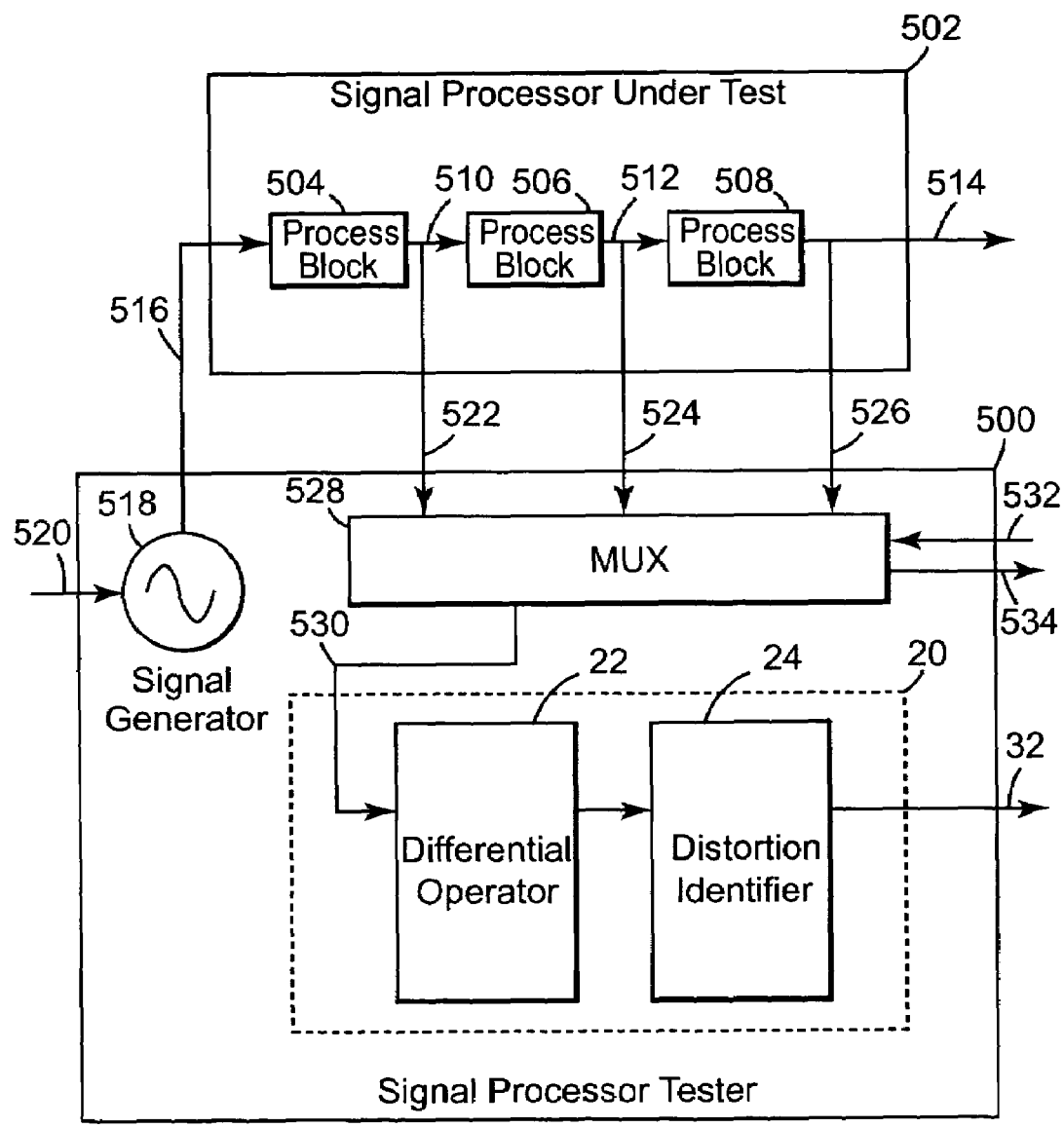
FIG. 6A is a block diagram illustrating one embodiment of a signal processor tester of the present invention.

One embodiment of a signal processor tester according to the present invention is illustrated generally at 500 in FIG. 6A. Signal processor tester 500 tests a signal processor 502 to identify any process blocks of signal processor 502 that introduce any errors into the signal being processed. Signal errors that are identifiable by signal processor tester 500 are manifested as signal distortions, which are defined above.

An example signal processor 502 to be tested, includes process blocks 504, 506, and 508. Each process block performs an operation on a signal being processed, and each process block is a potential source of signal error. Process block 504 receives an input signal to signal processor 502. Process block 504 provides output signal 510 to process block 506. Process block 506 provides output signal 512 to process block 508. Process block 508 provides output signal 514 as the processed signal output of signal processor 502.

Signal processor tester 500 tests signal processor 502 by stimulating signal processor 502 with an undistorted signal, indicated at 516, and by analyzing process block outputs 510, 512, and 514 for the presence of distortion. A process block having an undistorted input and a distorted output is thus identified as a source of signal error. Accordingly, signal processor tester 500 includes signal generator 518, which provides undistorted stimulating signal 516 to signal processor 502.

One embodiment of signal generator 518 provides a single-frequency sinusoidal signal 516 suitable for processing by signal processor 502. Any distortions introduced into a signal consisting of a single sinusoidal component, or processed version thereof, are more easily discernable than distortions introduced into a signal having a plurality of sinusoidal components.

Another embodiment of signal generator 518 provides at least one single-frequency sinusoidal signal 516 having a selectable frequency. An input 520 provides signal generation selection to signal generator 518 in this embodiment.

Signal processor tester 500 includes signal inputs 522, 524, and 526, which tap process block outputs 510, 512, and 514, respectively. Multiplexer 528 selects among signal inputs 522, 524, and 526, to provide a signal 530 for analysis to signal analyzer 20. Signal selection can be accomplished internally within multiplexer 528, or can be based on external signal selection input 532. In one embodiment wherein input signal selection is not based on external input 532, input signal selection output 534 provides an indication of which signal input is selected. In one embodiment wherein input signal selection is based on external input 532, output 534 is not employed.

Signal analyzer 20, comprising differential operator 22 and distortion identifier 24, can be implemented according to the various embodiments presented above. Distortion identifier output 32 comprises an indication of the presence of distortion in selected signal 530, and if any distortion is indicated, distortion identifier output 32 further comprises an indication of the approximate location of the at least one distortion within signal 530.

Figure 6B:
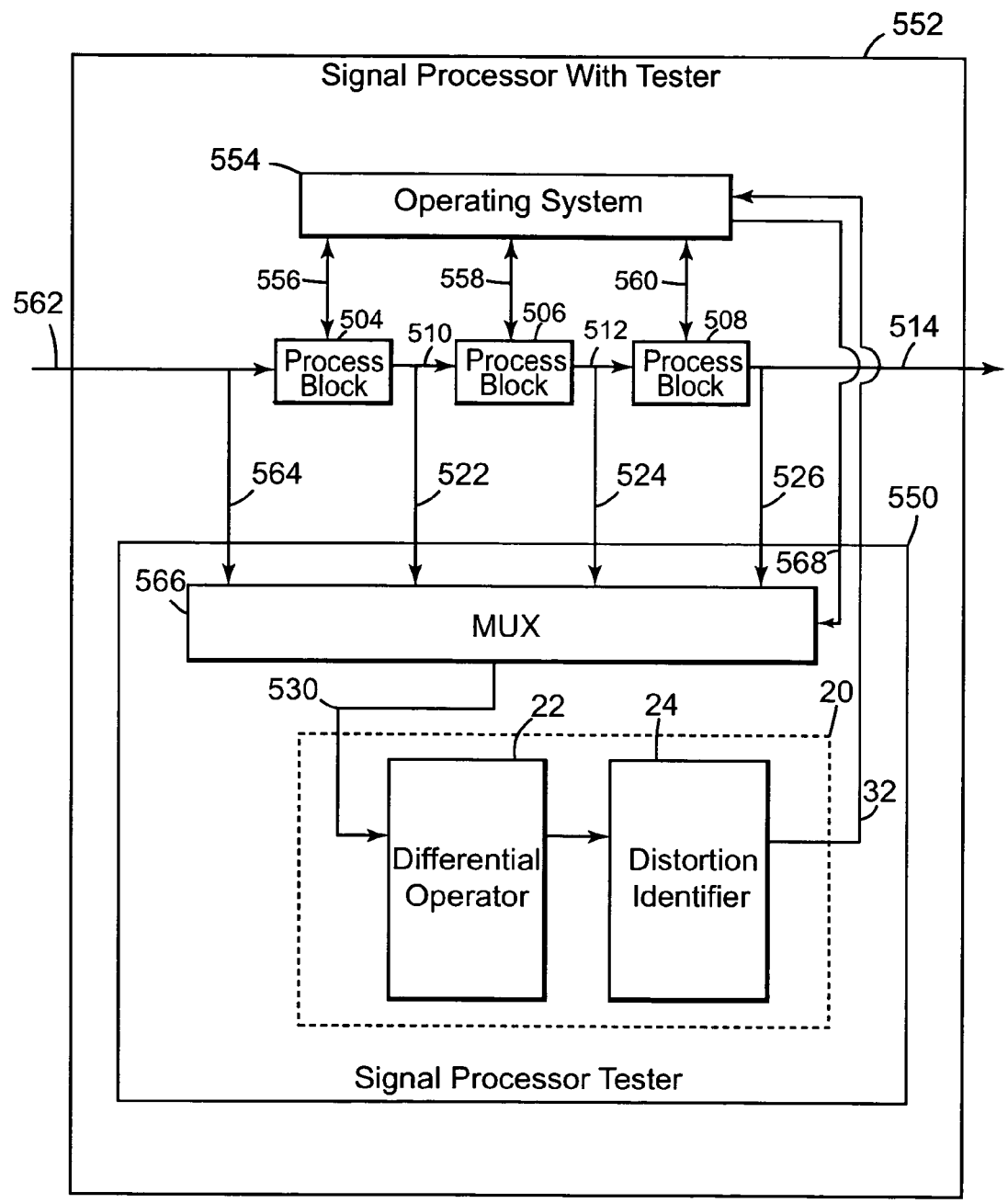
FIG. 6B is a block diagram illustrating a signal processor comprising a signal processor tester according to one embodiment of the present invention.

An embodiment of a signal processor tester 550 according to the present invention is illustrated in FIG. 6B. Signal processor tester 550 is integral to a signal processor 552. In this embodiment, signal processor 552 includes an operating system 554, which controls the overall operation of signal processor 552. Accordingly, interfaces 556, 558, and 560 control the operation of process blocks 504, 506, and 508, respectively. Signal processor 552 receives input signal 562, and performs signal processing on signal 552 to produce output 514. Signals 510 and 512 are outputs of intermediate process blocks 504 and 506, respectively.

Signal processor tester 550 includes signal inputs 564, 522, 524, and 526, which respectively tap input signal 562, and process block outputs 510, 512, and 514. A multiplexer 566 selects among signal inputs 564, 522, 524, and 526 to provide signal 530 for analysis to signal analyzer 20. Signal selection is provided by selection indication 568, which is provided by operating system 554.

Signal analyzer 20; comprising differential operator 22 and distortion identifier 24, can be implemented according to the various embodiments presented above. Distortion identifier output 32 is provided to operating system 554. Distortion identifier output 32 comprises an indication of the presence of distortion in selected signal 530, and if any distortion is indicated, distortion identifier output 32 further comprises an indication of the approximate location of the at least one distortion within signal 530.

Signal processor tester 550 tests signal processor 552's process blocks by evaluating any signal distortion at the input and output of each process block. A process block having an undistorted input, and having a distorted output is thus identifiable as a source of signal error. A process block having an input with distortions at determined points in the signal, and having a distorted output with additional points of distortion is also identifiable as a source of error.

Implementations

Figure 7:
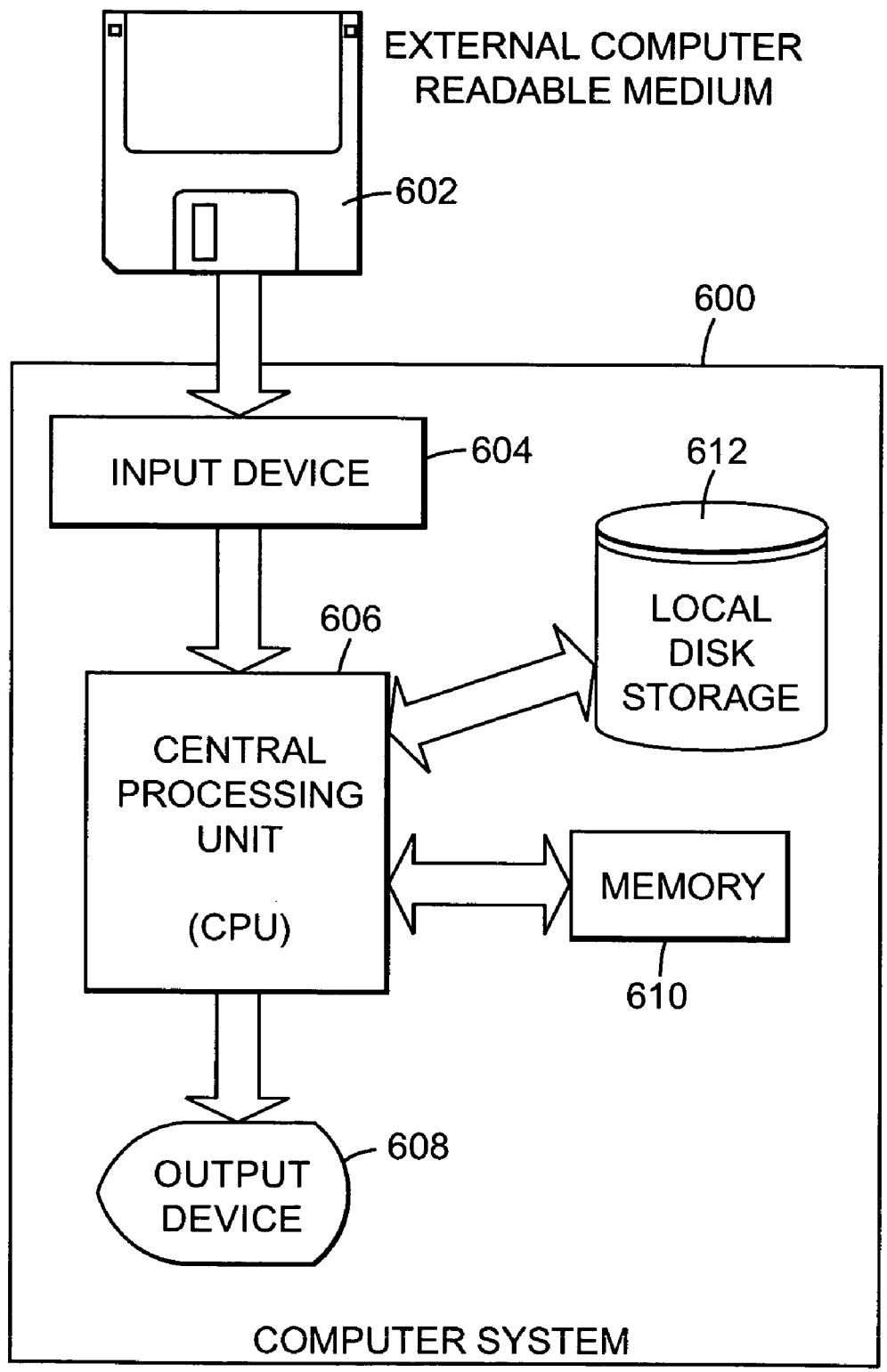
FIG. 7 is a block diagram of a computer system and a corresponding computer readable medium incorporating one or more main software program components of a signal analyzer according to the present invention.

The present invention can be realized in a number of embodiments, including one or more realizations in hardware, in software/firmware, and in a combination of hardware and software/firmware. When realized in software or firmware, the signal analyzer of the present invention can include several main components which are each a software program. The main software program components of the signal analyzer run on one or more computer systems. In one embodiment, each of the main software program components runs on its own computer system. FIG. 7 illustrates one embodiment of a computer system 600 and an external computer readable medium 602 which can be employed according to the present invention to implement one or more of the main software program components of a signal analyzer according to the present invention. Embodiments of external computer readable medium 602 include, but are not limited to: a nonvolatile memory, a CD-ROM, a floppy disk, and a disk cartridge. Any one of the main software program components of a Signal analyzer according to the present invention can be implemented in a variety of compiled and interpreted computer languages. External computer readable medium 602 stores source code, object code, executable code, shell scripts and/or dynamic link libraries for any one of the main software program components of a signal analyzer according to the present invention. An input device 604 reads external computer readable medium 602 and provides this data to computer system 600. Embodiments of input device 604 include but are not limited to: a USB port, a CD-ROM reader, a floppy disk drive, and a data cartridge reader.

Computer system 600 includes a central processing unit 606 for executing any one of the main software program components of a Signal analyzer according to the present invention. Computer system 600 also includes local disk storage 612, which is a computer readable medium for locally storing any one of the main software program components of a signal analyzer according to the present invention before, during, and after execution. Any one of the main software program components of a signal analyzer according to the present invention also utilizes memory 610, which is a computer readable medium within the computer system, during execution. Upon execution of any one of the main software program components of a signal analyzer according to the present invention, output data is produced and directed to an output device 608. Embodiments of output device 608 include, but are not limited to: a computer display device, a printer, and/or a disk storage device.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A signal analyzer system, comprising:
at least one differential operator configured to receive at least one input signal, and to determine at least one locus based on instantaneous differences in a relative rate of change between the at least one input signal and the at least one input signal's at least one $n^{th}$-order derivative, wherein n represents at least one selected order of differentiation; and
at least one distortion identifier configured to compare at least one amplitude of the at least one determined locus against at least one selected reference locus, and to identify at least one distortion in the at least one input signal when the comparison indicates at least one selected exception condition.

2. The signal analyzer system of claim 1, wherein the instantaneous differences in a relative rate of change between the at least one input signal and the at least one input signal's at least one $n^{th}$-order derivative, is determined by applying at least one $n^{th}$-order differential operator expressed as:

$$\psi_n\{x(t)\} = \frac{d x^{k+1}(x)}{dt} \cdot \frac{d^{n-k-1} x(t)}{dt^{n-1}} - \frac{d^k x(t)}{dt} \cdot \frac{d^{n-k} x(t)}{dt^n},$$

wherein n > k, n ∈ integers, reals or complex numbers to the at least one input signal, wherein x(t) represents the at least one input signal, and n represents the order of differentiation.

3. The signal analyzer system of claim 2, wherein k=1.

4. The signal analyzer system of claim 2 wherein the at least one determined locus includes at least one function of a plurality of differential operators $\psi_n\{x(t)\}$ of selected orders n applied to the at least one input signal x(t).

5. The signal analyzer system of claim 4 wherein the at least one function is $\omega\{x(t)\}$ computed based on the ratio of the fourth-order differential operator applied to the at least one input x(t) signal, to the at least one input x(t) second-order differential operator applied to the at least one input x(t) signal.

6. The signal analyzer system of claim 5 wherein the at least one function is $\omega\{x(t)\}$ computed as the square root of the absolute value of the quotient of the fourth-order and second-order differential operators applied to the at least one input x(t) signal, as follows:

$$\omega\{x(t)\} = \sqrt{\left|\frac{\psi_4\{x(t)\}}{\psi_2\{x(t)\}}\right|}.$$

7. The signal analyzer system of claim 4 wherein the at least one function is $\rho\{x(t)\}$ computed based on the ratio of the third-order differential operator applied to the at least one input x(t) signal, to the second-order differential operator applied to the at least one input x(t) signal.

8. The signal analyzer system of claim 7 wherein the at least one function is $\rho\{x(t)\}$ computed as the absolute value of one-half of the quotient of the third-order and second-order differential operators applied to the at least one input x(t)signal, as follows:

$$\rho\{x(t)\} = \left|\frac{\psi_3\{x(t)\}}{2\psi_2\{x(t)\}}\right|.$$

9. The signal analyzer system of claim 4 wherein the at least one function is $A\{x(t)\}$ computed based on the ratio of the second-order differential operator applied to the at least one input x(t) signal, to the fourth-order differential operator applied to the at least one input x(t) signal.

10. The signal analyzer system of claim 9 wherein the at least one function is $A\{x(t)\}$ computed as the absolute value of the quotient of the second-order differential operator and the square root of the absolute value of the fourth-order differential operator applied to the at least one input x(t) signal, as follows:

$$A\{x(t)\} = \left|\frac{\psi_2\{x(t)\}}{\sqrt{|\psi_4\{x(t)\}|}}\right|.$$

11. The signal analyzer system of claim 1 wherein the at least one differential operator comprises:
at least one differentiator configured to calculate at least one derivative of at least one selected order of the at least one input signal; and
at least one algebraic operator configured to calculate at least one Lie bracket of a selected order, of the at least one input signal and its calculated derivatives, based on the following relationship:

$$\frac{dx(t)}{dt} \cdot \frac{d^{n-1}x(t)}{dt^{n-1}} - x(t) \cdot \frac{d^n x(t)}{dt^n},$$

wherein $n \in$ integers, reals or complex numbers wherein x(t) represents the at least one input signal, and n represents the selected Lie bracket order.

12. The signal analyzer system of claim 1 wherein the at least one distortion identifier includes at least one distortion detector configured to compare the at least one determined locus and the at least one selected reference locus, and provide at least one output that potentially represents a presence of the at least one selected exception condition according to a result of the comparison, wherein the at least one output identifies the presence of distortion in the at least one input signal.

13. The signal analyzer system of claim 12 wherein the at least one reference locus includes at least one selected threshold having an amplitude that is between amplitudes of points of the at least one determined locus corresponding to distortions of the at least one input signal, and other amplitudes of the at least one determined locus.

14. The signal analyzer system of claim 1 wherein the at least one distortion identifier comprises:
at least one distortion localizer configured to approximately locate distortions within the input signal by ascertaining any independent variable values of the signal that correspond to at least one point of the determined locus, the at least one point having an amplitude that indicates the presence of the at least one distortion in the at least one input signal.

15. A method for analyzing a signal, comprising:
determining at least one locus based on instantaneous differences in a relative rate of change between the signal and the signal's at least one $n^{th}$-order derivative, wherein n represents at least one selected order of differentiation;
comparing at least one amplitude of the at least one determined locus against at least one selected reference locus; and
identifying at least one distortion in the signal when the comparison indicates at least one selected exception condition.

16. The method in claim 15, wherein the instantaneous differences in a relative rate of change between the signal and the signal's at least one $n^{th}$-order derivative, is determined by applying at least one $n^{th}$-order differential operator expressed as:

$$\psi_n\{x(t)\} = \frac{dx^{k+1}(x)}{dt} \cdot \frac{d^{n-k-1}x(t)}{dt^{n-1}} - \frac{d^k x(t)}{dt} \cdot \frac{d^{n-k}x(t)}{dt^n},$$

wherein $n > k$, $n \in$ integers, reals or complex numbers to the signal, wherein x(t) represents the signal, and n represents the order of differentiation.

17. The method in claim 15 wherein the signal is represented in a discrete domain, wherein discrete domain refers to at least one of a signal's amplitude and a signal's independent variable, as being discretized.

18. The method of claim 15 wherein the identified at least one distortion includes at least one discontinuity of the signal.

19. The method of claim 15 wherein the at least one distortion includes at least one signal acquisition/processing error, wherein signal acquisition/processing errors include sampling, quantization, and signal processing errors.

20. The method of claim 16 wherein the at least one determined locus includes more than one application of a differential operator $\psi_n\{x(t)\}$ of selected orders n to the signal expressed as x(t).

21. The method of claim 16 wherein the at least one determined locus includes at least one function of a plurality of differential operators $\psi_n\{x(t)\}$ of selected orders n applied to the signal expressed as x(t).

22. The method of claim 21 wherein the at least one function is $\omega\{x(t)\}$ computed based on the ratio of the fourth-order differential operator applied to the x(t) signal, to the second-order differential operator applied to the x(t) signal.

23. The method of claim 22 wherein the at least one function is $\omega\{x(t)\}$ computed as the square root of the absolute value of the quotient of the fourth-order and second-order differential operators applied to the x(t) signal, as follows:

$$\omega\{x(t)\} = \sqrt{\left|\frac{\psi_4\{x(t)\}}{\psi_2\{x(t)\}}\right|}.$$

24. The method of claim 21 wherein the at least one function is $\rho\{x(t)\}$ computed based on the ratio of the third-order differential operator applied to the x(t) signal, to the second-order differential operator applied to the x(t) signal.

25. The method of claim 24 wherein the at least one function is $\rho\{x(t)\}$ computed as the absolute value of one-half of the quotient of the third-order and second-order differential operators applied to the x(t) signal, as follows:

$$\rho\{x(t)\} = \left|\frac{\psi_3\{x(t)\}}{2\psi_2\{x(t)\}}\right|.$$

26. The method of claim 21 wherein the at least one function is $A\{x(t)\}$ computed based on the ratio of the second-order differential operator applied to the x(t) signal, to the fourth-order differential operator applied to the x(t) signal.

27. The method of claim 26 wherein the at least one function is $A\{x(t)\}$ computed as the absolute value of the quotient of the second-order differential operator and the square root of the absolute value of the fourth-order differential operator applied to the x(t) signal, as follows:

$$A\{x(t)\} = \left|\frac{\psi_2\{x(t)\}}{\sqrt{|\psi_4\{x(t)\}|}}\right|.$$

28. The method of claim 15 wherein at least one $m^{th}$-order derivative of the signal is calculated prior to subsequent determination of the at least one locus, wherein m is an integer greater than or equal to 1 representing the order of differentiation.

29. The method of claim 15 wherein the at least one reference locus includes at least one selected threshold having an amplitude that is between amplitudes of points of the at least one determined locus corresponding to distortions of the signal, and other amplitudes of the at least one determined locus.

30. The method of claim 15 further comprising:
approximately locating distortions within the signal by ascertaining any independent variable values of the signal that correspond to at least one point of the determined locus, the at least one point having an amplitude that indicates the presence of the at least one distortion of a signal.

31. A method for analyzing a digital representation of a sinusoidal signal potentially having at least one distortion, comprising:

determining at least one locus based on instantaneous differences in a relative rate of change between the digital signal and the digital signal's at least one $n^{th}$-order derivative, wherein n represents at least one selected order of differentiation;

comparing at least one amplitude of the at least one determined locus against at least one selected reference locus; and identifying at least one distortion in the digital signal when the comparison indicates at least one selected exception condition.

32. The method of claim 31 wherein the instantaneous differences in a relative rate of change between the digital signal and the digital signal's at least one $n^{th}$-order derivative, is determined by applying at least one $n^{th}$-order differential operator expressed as:

$$\psi_n(x[t]) = x'[t] \cdot x^{n-1}[t] - x[t] \cdot x^n[t]$$

to the digital signal, wherein x[t] represents the digital signal and $x^n[t]$ represents an $n^{th}$-order discretized derivative of x[t], and n is an integer greater than 1 representing the order of differentiation.

33. The method of claim 31 wherein the identified at least one distortion includes at least one signal acquisition/processing error, wherein signal acquisition/processing errors include sampling, quantization, and programming errors.

34. The method of claim 32 wherein the at least one determined locus includes at least one relationship of a plurality of differential operators $\psi_n\{x[t]\}$ of selected orders n applied to the digital signal x[t].

35. The method of claim 31 wherein at least one discretized $m^{th}$-order derivative of the digital signal is calculated prior to subsequent determination of the at least one locus, wherein m is an integer greater than or equal to 1.

36. The method of claim 31 wherein the at least one reference locus includes at least one selected threshold having an amplitude that is between amplitudes of points of the at least one determined locus corresponding to any distortions in the digital signal, and other amplitudes of the at least one determined locus.

37. The method of claim 31 further comprising:
approximately locating any errors within the digital signal, by ascertaining any independent variable values of the digital signal that correspond to at least one point of the determined locus, the at least one point having an amplitude that indicates the presence of the at least one distortion in the digital signal.

38. A method for testing a signal processing system, the method comprising:
providing at least one input signal to the signal processing system under test;
monitoring at least one output signal of the signal processing system under test;
analyzing the at least one monitored output signal by determining at least one locus based on instantaneous differences in a relative rate of change between the at least one monitored output signal and the at least one monitored output signal's at least one $n^{th}$-order derivative, wherein n represents at least one elected order of differentiation;
comparing at least one amplitude of the at least one determined locus against at least one selected reference locus; and
identifying at least one distortion in the output signal when the comparison indicates at least one selected exception condition.

39. The method of claim 38 wherein the instantaneous differences in a relative rate of change between the at least one monitored output signal and the at least one monitored output signal's at least one $n^{th}$-order derivative, is determined by applying at least one $n^{th}$-order differential operator expressed as:

$$\psi_n\{x(t)\} = \frac{dx^{k+1}(x)}{dt} \cdot \frac{d^{n-k-1}x(t)}{dt^{n-1}} - \frac{d^k x(t)}{dt} \cdot \frac{d^{n-k}x(t)}{dt^{n-1}},$$

wherein $n > k$, $n \in$ integers, reals or complex numbers to the at least one monitored output signal, wherein $x(t)$ represents the signal, and n represents the at least one monitored output order of differentiation.

40. The method of claim 38 wherein the at least one provided input signal includes at least one single-frequency sinusoidal signal of a selected frequency.

41. The method of claim 38 wherein the at least one monitored output signal includes at least one output signal from a portion of a process of the signal processing system under test.

42. The method of claim 38 wherein the at least one monitored output signal is represented in a discrete domain, wherein discrete domain refers to at least one of a signal's amplitude and a signal's independent variable, as being discretized.

43. The method of claim 38 wherein the identified at least one distortion includes at least one discontinuity of the at least one monitored output signal.

44. The method of claim 39 wherein the at least one determined locus includes at least one relationship of a plurality of differential operators $\psi_n\{x(t)\}$ of selected orders n applied to the at least one monitored output signal $x(t)$.

45. The method of claim 38 wherein the at least one reference locus includes at least one selected threshold having an amplitude that is between amplitudes of points of the at least one determined locus corresponding to distortions of the at least one monitored output signal, and other amplitudes of the at least one determined locus.

46. The method of claim 38 further comprising:
approximately locating distortions within the at least one monitored output signal by ascertaining any independent variable values of the at least one monitored output signal that correspond to the at least one point of the determined locus, the at least one point having an amplitude that indicates the presence of the at least one distortion of the at least one monitored output signal.

47. A signal processor testing system, comprising:
at least one differential operator configured to interface with at least one signal processor under test, receive at least one signal from the at least one signal processor under test, and determine at least one locus based on instantaneous differences in a relative rate of change between the at least one received signal and the at least one received signal's at least one $n^{th}$-order derivative, wherein n represents at least one selected order of differentiation; and
at least one distortion identifier configured to compare at least one amplitude of at least one determined locus against at least one selected reference locus, and identify at least one distortion in the at least one received signal when the comparison indicates at least one selected exception condition.

48. The signal processor testing system of claim 47 wherein the at least one differential operator comprises:

at least one differentiator configured to calculate at least one derivative of at least one selected order, of the at least one received signal; and
at least one algebraic operator configured to calculate at least one Lie bracket of a selected order, of the at least one received signal and its calculated derivatives, based on the following relationship:

$$\frac{dx(t)}{dt} \cdot \frac{d^{n-1}x(t)}{dt^{n-1}} - x(t) \cdot \frac{d^n x(t)}{dt^n},$$

wherein $n \in$ integers, reals or complex numbers wherein $x(t)$ represents the at least one received signal, and n represents the selected Lie bracket order.

49. The signal processor testing system of claim 47 wherein the at least one distortion identifier includes:
at least one distortion detector configured to compare the at least one amplitude of the at least one determined locus against the at least one selected reference locus, compare the at least one determined locus and the at least one selected reference locus, and provide at least one output that potentially represents a presence of the at least one selected exception condition according to a result of the comparison, wherein the at least one output identifies the presence of distortions in the at least one received signal.

50. The signal processor testing system of claim 49 wherein the at least one reference locus includes at least one selected threshold having an amplitude that is between amplitudes of points of the at least one determined locus corresponding to distortions of the signal, and other amplitudes of the at least one determined locus.

51. The signal processor testing system of claim 47 wherein the at least one distortion identifier comprises:
at least one distortion localizer configured to approximately locate distortions within the at least one received signal by ascertaining any independent variable values of the at least one received signal that correspond to at least one point of the at least one determined locus, the at least one point having an amplitude that indicates the presence of the at least one distortion in the signal.

52. The signal processor testing system of claim 46 further comprising at least one signal generator configured to provide at least one input signal to the at least one signal processor under test.

53. The signal processor testing system of claim 52 wherein the at least one input signal includes at least one single-frequency sinusoidal signal of a selected frequency.

54. A signal processing system comprising:
at least one process block for receiving at least one signal to be processed from at least one suitable signal source, including at least one other process block, performing at least one selected operation on the at least one received signal, and providing an output that includes at least one result of the at least one operation performed on the at least one received signal; and
at least one signal analyzer system interfaced to the at least one process block, the at least one signal analyzer including:
at least one differential operator configured to accept at least one signal from among at least one process block's input and output signals, and determine at least one locus based on instantaneous differences in a relative rate of change between the at least one accepted signal and the at least one accepted signal's at least one $n^{th}$-order derivative, wherein n represents at least one selected order of differentiation; and at least one distortion identifier configured to compare at least one amplitude of the at least one determined locus against at least one selected reference locus, and identify at least one distortion in the at least one accepted signal when the comparison indicates at least one selected exception condition.

55. The signal processing system of claim 54 wherein the instantaneous differences in a relative rate of change between the at least one accepted signal and the at least one accepted signal's at least one $n^{th}$-order derivative, is determined by applying at least one $n^{th}$-order differential operator expressed as:

$$\psi_n\{x(t)\} = \frac{dx^{k+1}(x)}{dt} \cdot \frac{d^{n-k-1}x(t)}{dt^{n-1}} - \frac{d^k x(t)}{dt} \cdot \frac{d^{n-k}x(t)}{dt^n},$$

to the at least one accepted signal, wherein x(t) represents the at least one accepted signal, and n represents the order of differentiation.

56. The signal processing system of claim 55 wherein the at least one determined locus includes at least one relationship of a plurality of differential operators $\psi_n\{x(t)\}$ of selected orders n applied to the at least one accepted signal x(t).

57. The signal processing system of claim 54 wherein the at least one distortion identifier includes:

at least one distortion detector configured to compare the at least one determined locus and the at least one reference locus, and provide at least one output that potentially represents a presence of the exception condition according to a result of the comparison, wherein the at least one output identifies the presence of distortions in the at least one accepted input signal.

58. The signal processing system of claim 57 wherein the at least one reference locus includes at least one selected threshold having an amplitude that is between amplitudes of points of the at least one determined locus corresponding to distortions of the at least one accepted signal, and other amplitudes of the at least one determined locus.

59. The signal processing system of claim 54 wherein the at least one distortion identifier comprises:

at least one distortion localizer configured to approximately locate distortions within the at least one accepted signal by ascertaining any independent variable values of the at least one accepted signal that correspond to at least one point of the determined locus, the at least one point having an amplitude that indicates the presence of the at least one distortion in the at least one accepted signal.

* * * * *